United States Patent
Dove

Patent Number: 6,091,729
Date of Patent: Jul. 18, 2000

[54] METHODS AND APPARATUS FOR HIGH-SPEED DATA TRANSFER THAT MINIMIZES CONDUCTORS

[75] Inventor: Jason W. Dove, Novato, Calif.

[73] Assignee: Alcatel USA Sourcing, L.P., Plano, Tex.

[21] Appl. No.: 08/979,383

[22] Filed: Nov. 26, 1997

Related U.S. Application Data

[60] Provisional application No. 60/032,045, Nov. 27, 1996, provisional application No. 60/031,898, Nov. 27, 1996, and provisional application No. 60/031,828, Nov. 27, 1996.

[51] Int. Cl.⁷ ................................................ H04L 12/56
[52] U.S. Cl. ............................ 370/395; 370/359; 370/419
[58] Field of Search ................................... 370/359, 362, 370/364, 389, 395, 419, 428, 360

[56] References Cited

U.S. PATENT DOCUMENTS

| | | | |
|---|---|---|---|
| 5,452,330 | 9/1995 | Goldstein | 375/257 |
| 5,453,979 | 9/1995 | Schibler et al. | 370/60.1 |
| 5,602,850 | 2/1997 | Wilkinson et al. | 370/402 |
| 5,619,500 | 4/1997 | Hiekali | 370/414 |
| 5,631,908 | 5/1997 | Saxe | 370/235 |
| 5,729,546 | 3/1998 | Gupta et al. | 370/434 |
| 5,864,539 | 1/1999 | Yin | 370/236 |
| 5,901,146 | 5/1999 | Upp | 370/389 |
| 5,926,475 | 7/1999 | Saldinger et al. | 370/394 |
| 6,009,092 | 12/1999 | Basilico | 370/352 |

OTHER PUBLICATIONS

International Search Report mailed Sep. 30, 1998.

*Primary Examiner*—Douglas W. Olms
*Assistant Examiner*—Ken Vanderpuye
*Attorney, Agent, or Firm*—Fliesler Dubb Meyer & Lovejoy

[57] ABSTRACT

A cell bus, which reduces the number of conductors required to transfer data in a telecommunications switching fabric, contains a plurality of conductors, Data[X:0], for transmitting information. A cell bus interface generates a cell bus frame that includes a plurality of words, "X" bits in length, of both data and control information that includes, in part, routing information for the data. As a result of encapsulating data and control information into and cell bus frame for transmission on the Data[X:0] conductors, the number of conductors required to transmit data is reduced. An asynchronous transfer mode (ATM) switching fabric, which includes a plurality of cell buses configured in a point to point fashion between a cell routing unit (CRU)/ATM fiber bank interface unit (AFIU) and a plurality of optical line units (OLUs), is also disclosed.

15 Claims, 10 Drawing Sheets

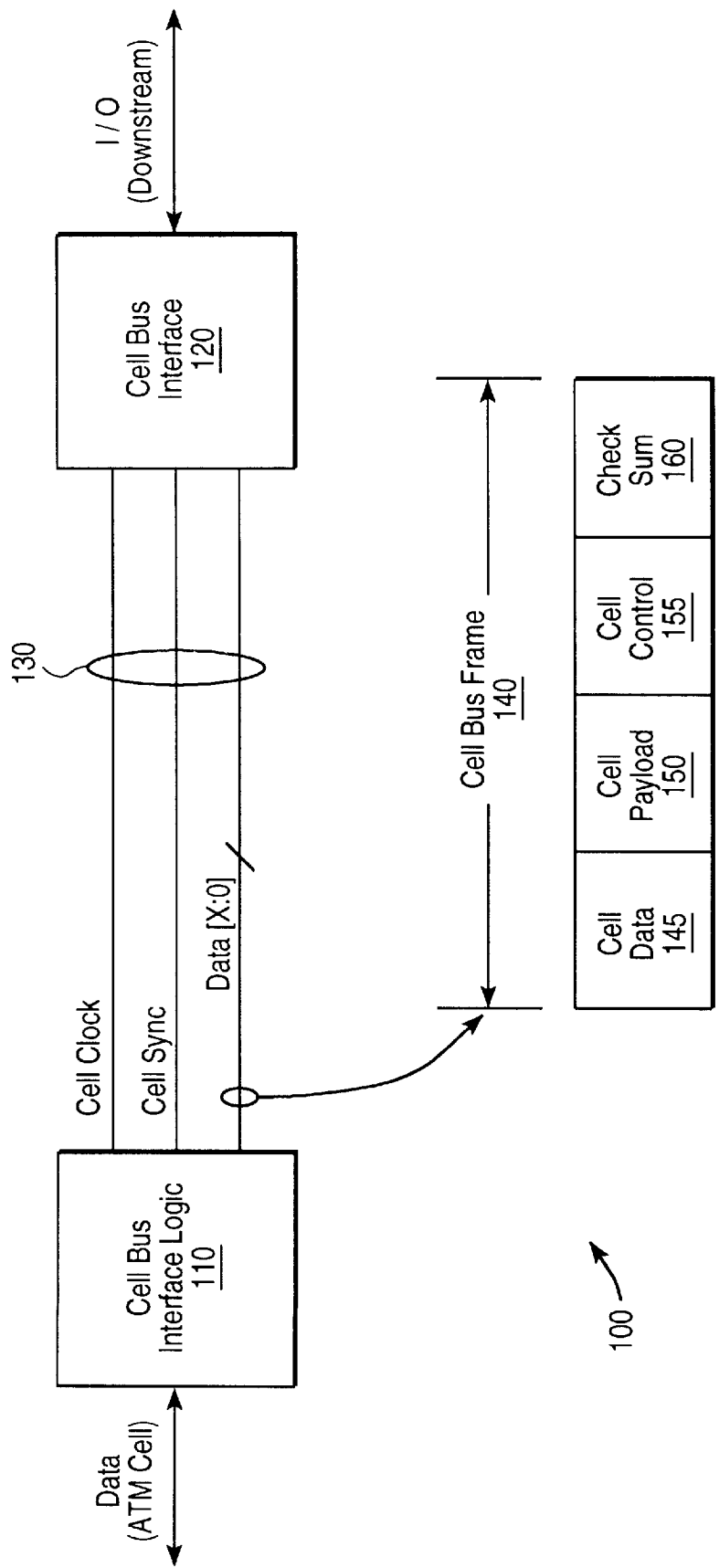

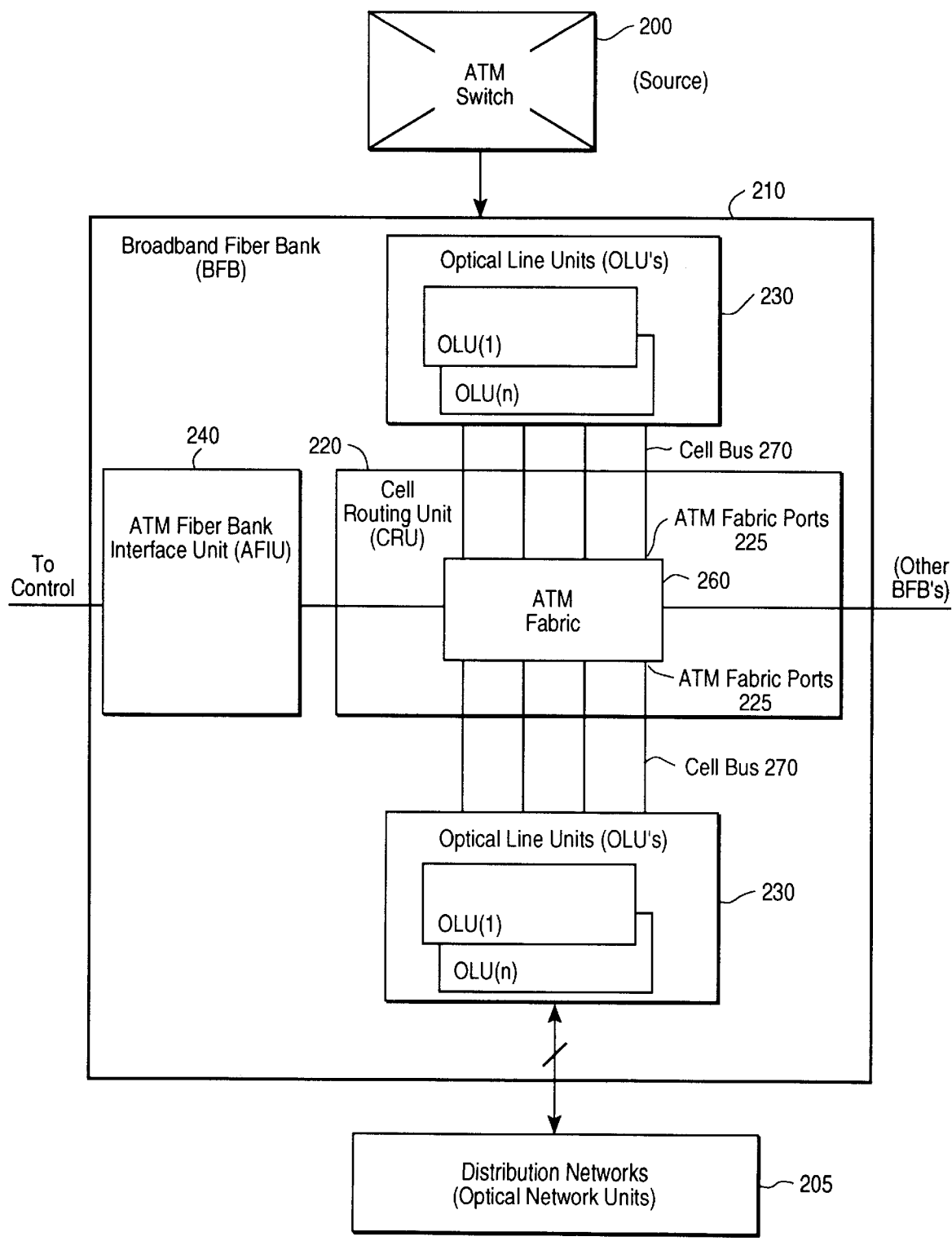
FIG_2

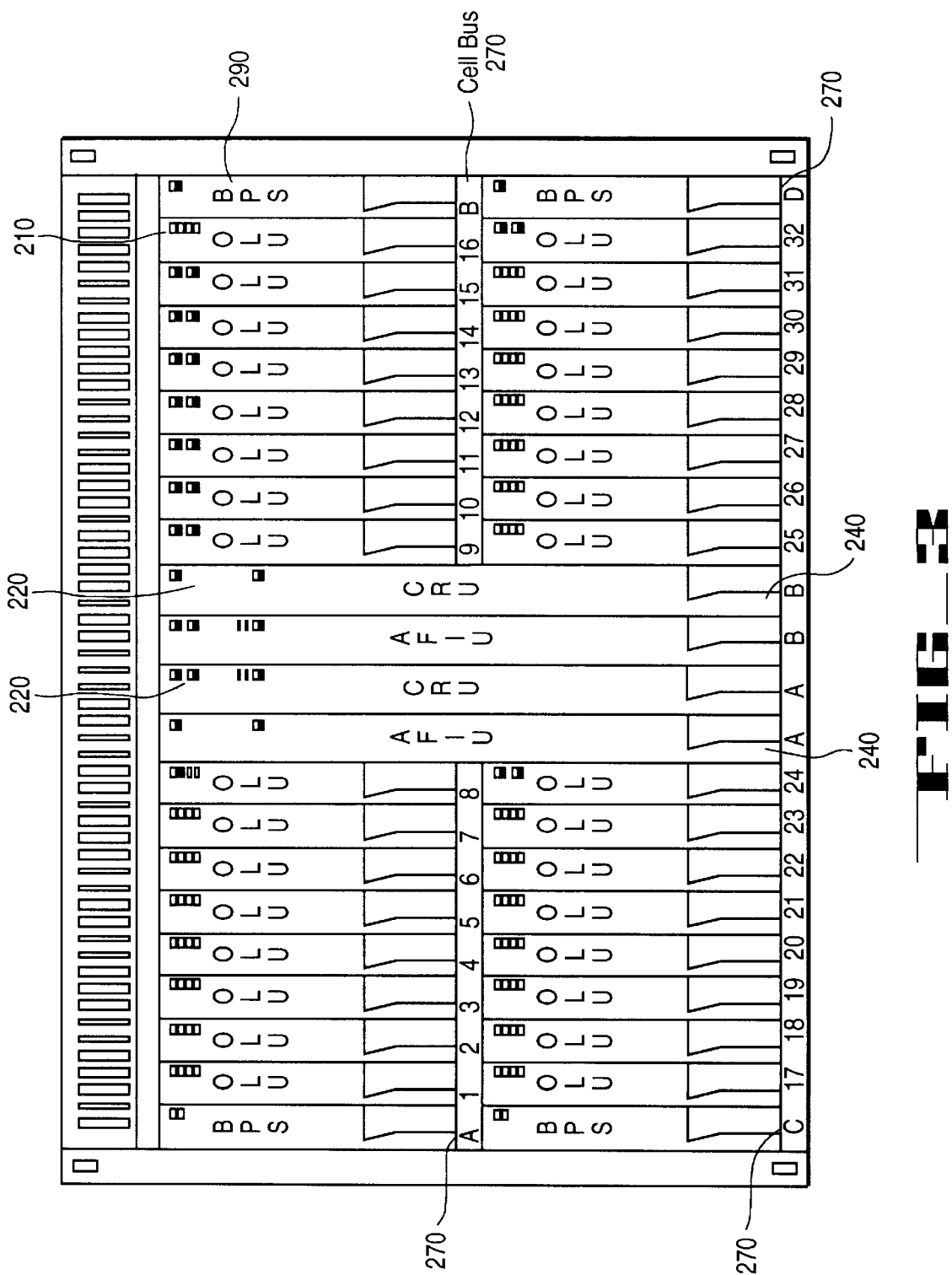
FIG_3

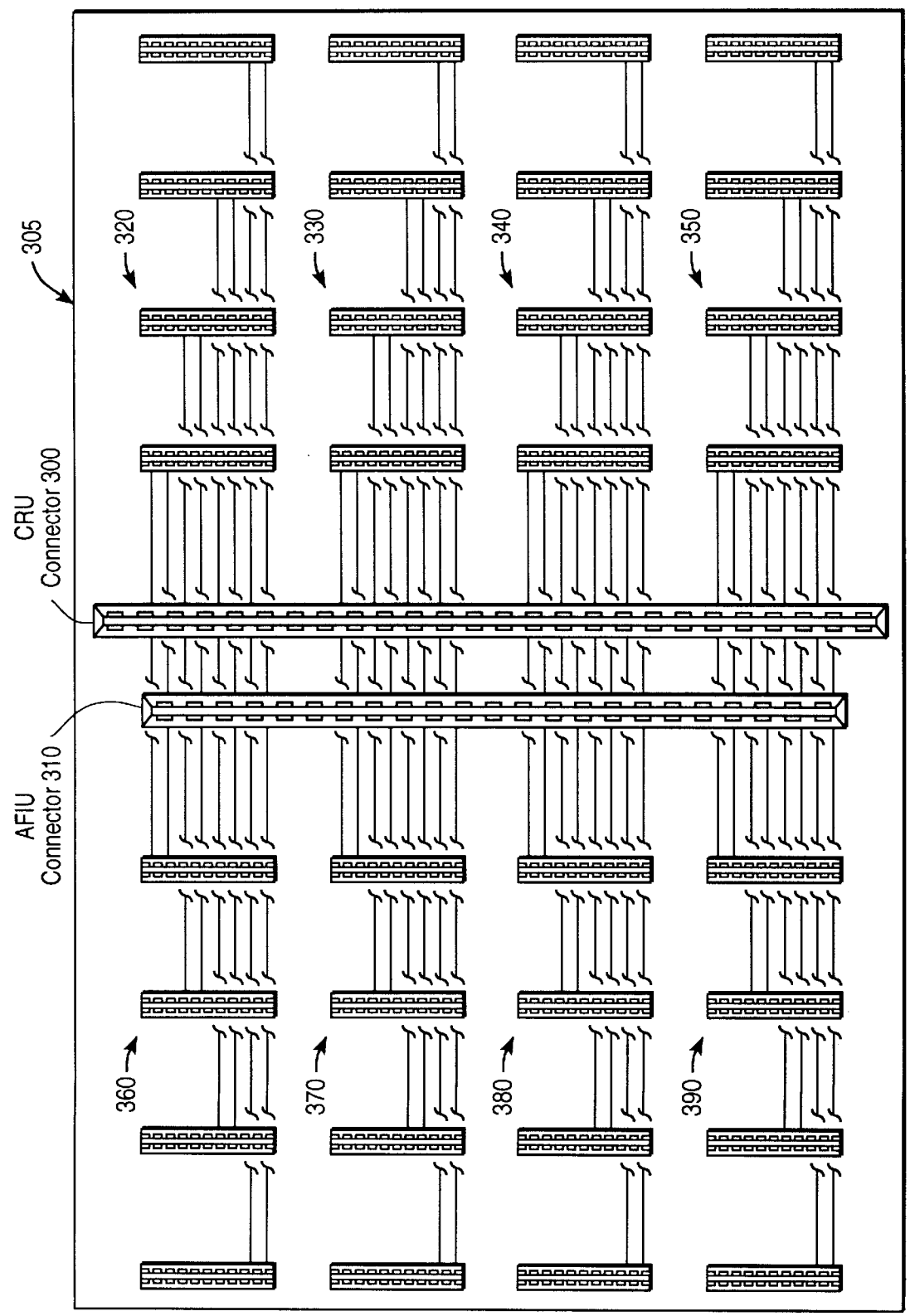
FIG_4

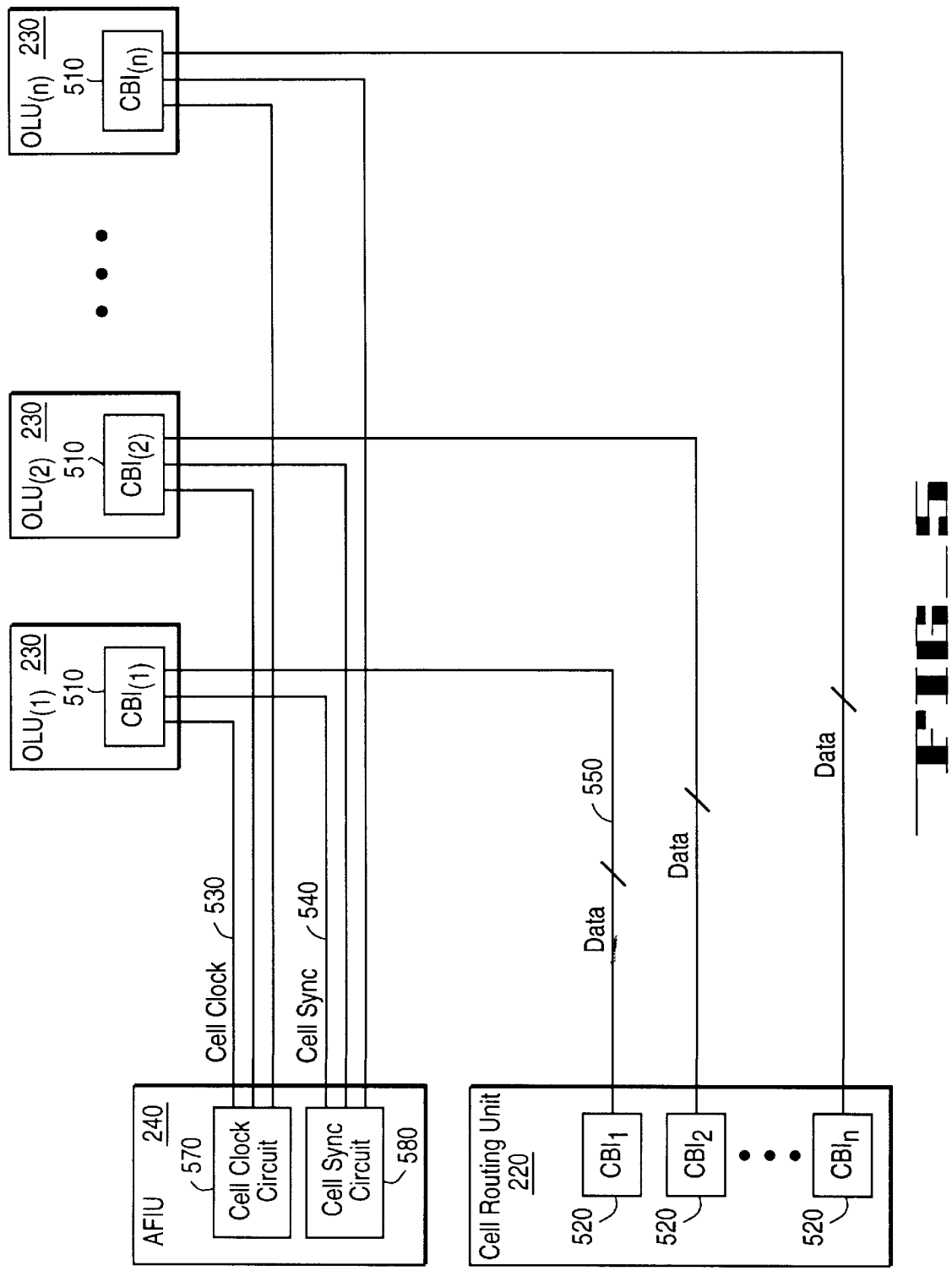
FIG_5

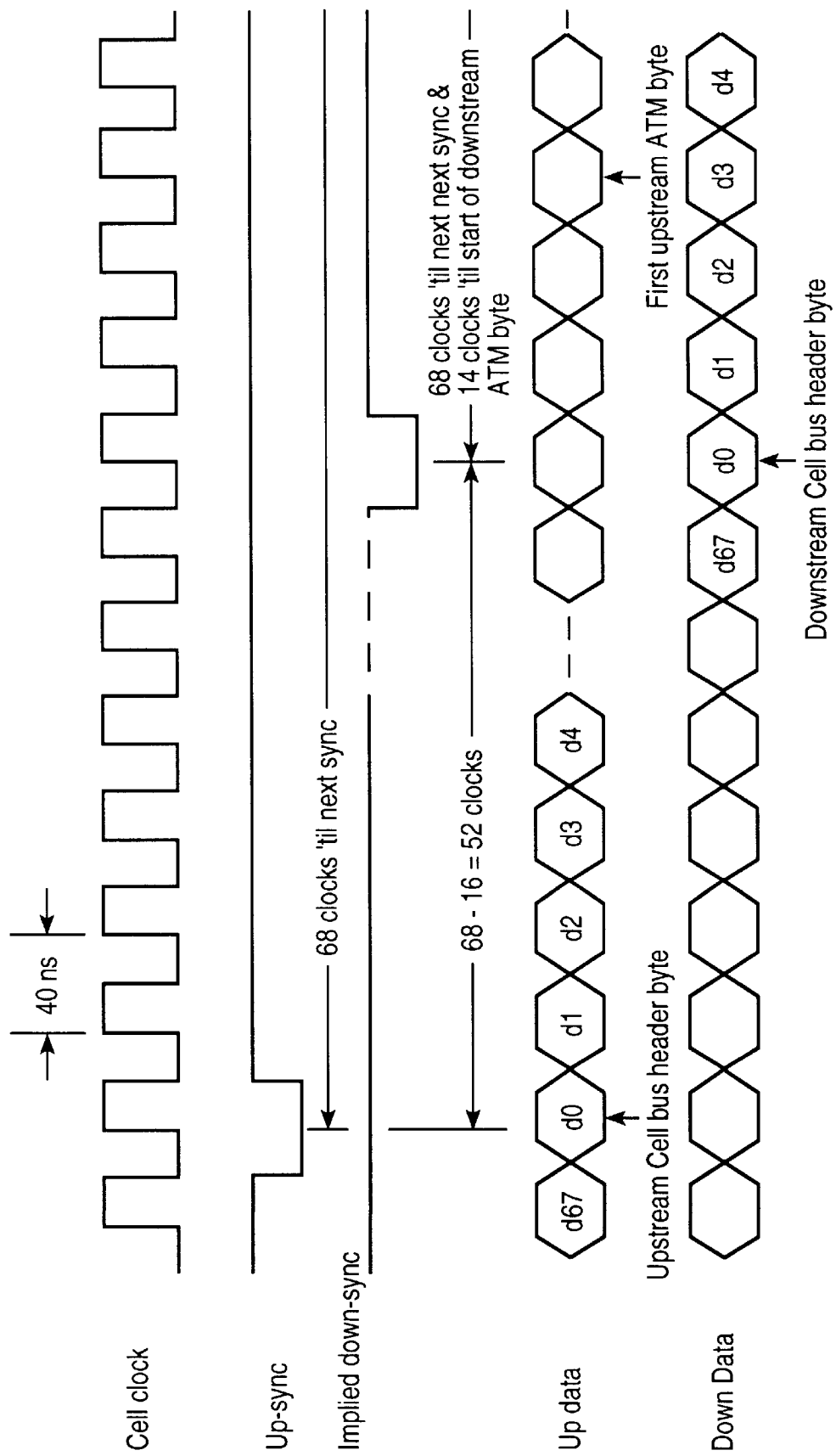

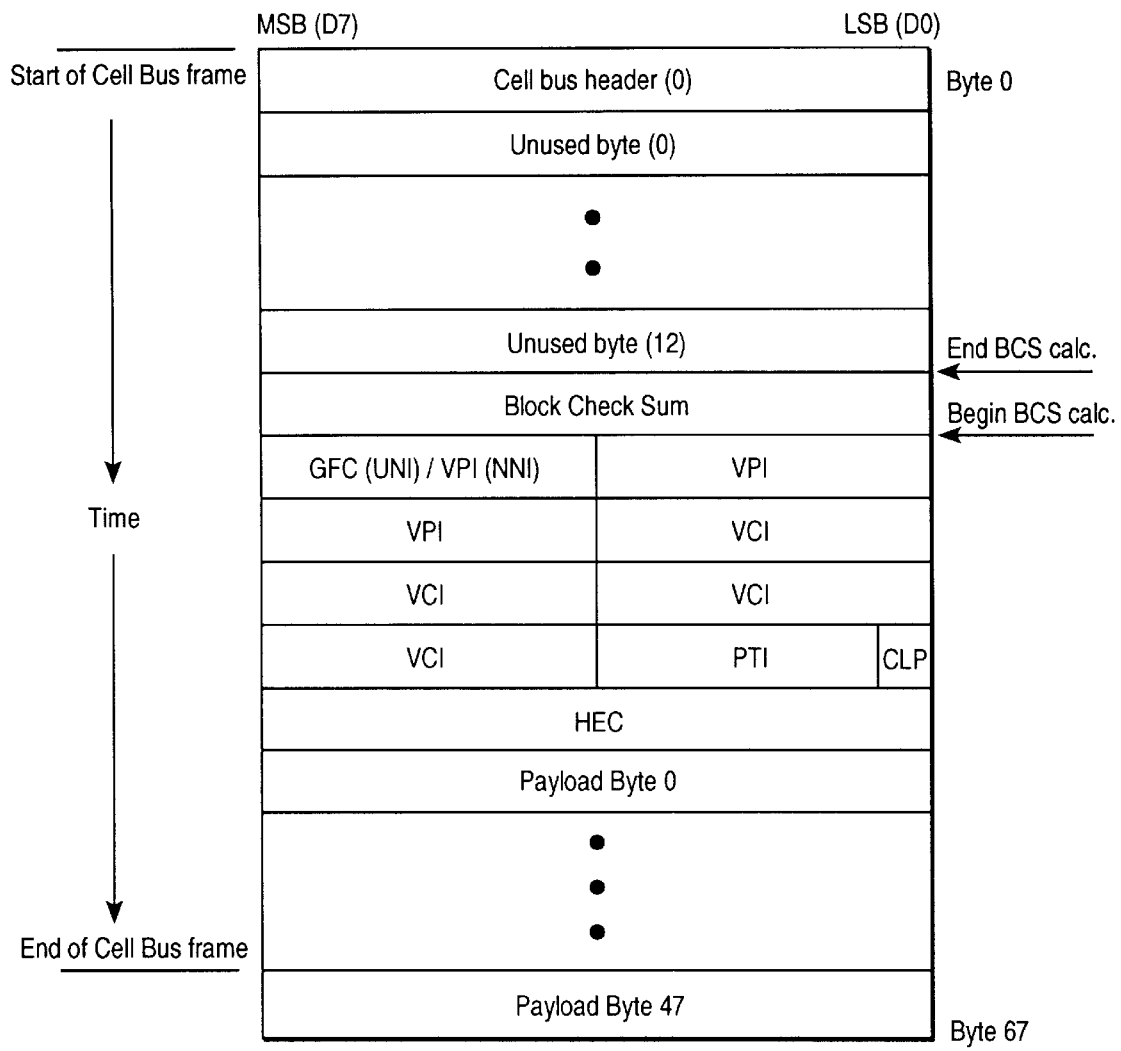
FIG_7

| MSB | | | | | | | | LSB |
|---|---|---|---|---|---|---|---|---|
| IDLE_U | nu | nu | /BP_D | RT_U3 | RT_U2 | RT_U1 | RT_U0 | |

FIG. 8A

| MSB | | | | | | | | LSB |
|---|---|---|---|---|---|---|---|---|
| IDLE_D | nu | nu | /BP_U | RT_D3 | RT_D2 | RT_D1 | RT_D0 | |

FIG. 8B

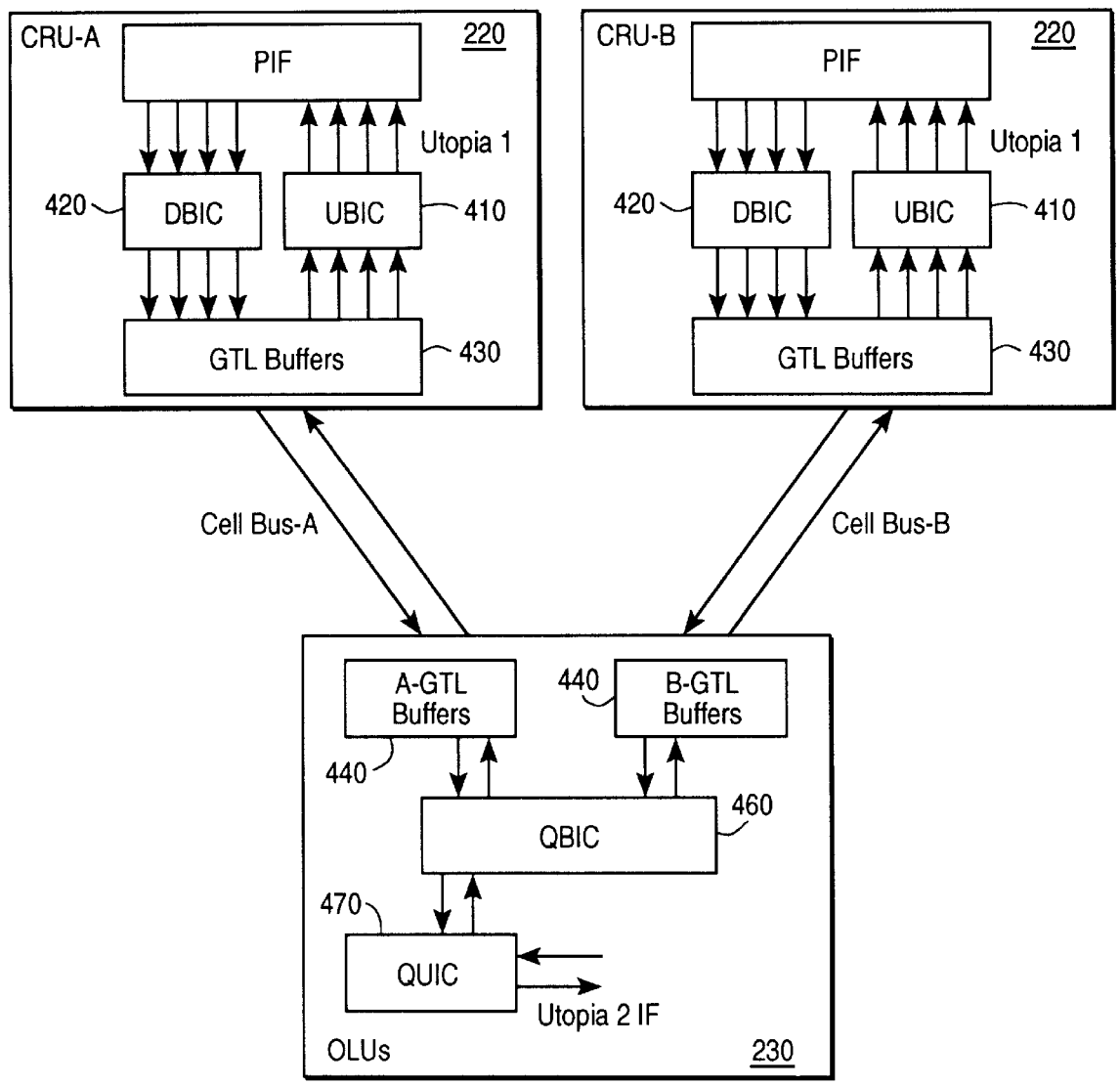
FIG_9

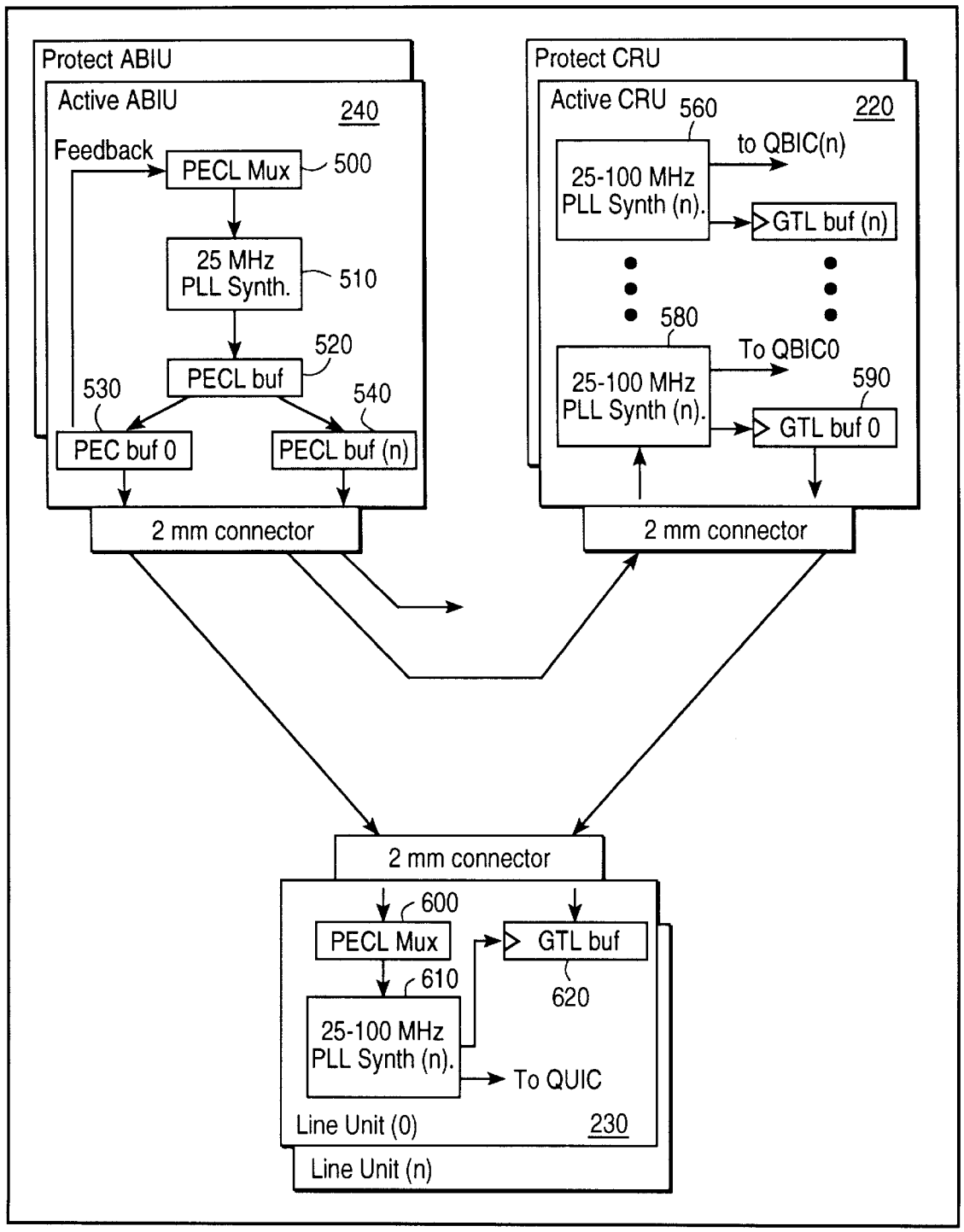
FIG_10

METHODS AND APPARATUS FOR HIGH-SPEED DATA TRANSFER THAT MINIMIZES CONDUCTORS

The present application claims priority from: U.S. Provisional Application Ser. No. 60/032,045, entitled "Cell Bus", filed Nov. 27, 1996; U.S. Provisional Application Ser. No. 60/031,898, entitled "Optical Network Unit", filed Nov. 27, 1996; and U.S. Provisional Application Ser. No. 60/031,828, entitled "Broadband Fiber Bank", filed Nov. 27, 1996.

BACKGROUND OF THE INVENTION

1. Field of the Invention

The present invention is directed toward the field of high-speed data transfer, and more particularly to methods and apparatus for transferring data while minimizing the number of conductors required.

2. Art Background

In general, broadband telecommunications involves transmitting data over a wide or "broad" range of frequencies. Typically, fiber conductors or fiber optics, which transmit a broad range of frequencies, are used in broadband telecommunications applications as the preferred transmission medium. The advantage of broadband telecommunications is the ability to transmit large amount of data at high-speeds. For example, broadband telecommunications permits transmission of digital video at rates sufficient to transfer full motion video.

Broadband telecommunications applications involve switching data at high aggregate bandwidth rates. For example, telecommunications systems employing fiber optics may require switching rates as high as several giga bits per second (Gbps). Broadband telecommunications systems, like traditional digital telephony systems, employ switching equipment to effectuate transmission of data from a source, such as a wide area network, to a destination, such as an end user's home or business. This type of broadband telecommunications switching equipment involves the transfer of data, at high-speeds, within a "switching fabric." Data transfer, among components or subsystems in the switching fabric, requires operation in accordance with predetermined timing specifications or requirements. For example, transmission of data within broadband switching fabrics that support high aggregate bandwidth is measured in term of optical carrier rates. (e.g., OC-3, OC-12, OC-48 . . . OC-192). Accordingly, switching fabrics in broadband telecommunications require high-speed data transfer.

Components of a telecommunications system typically have product life cycles of up to twenty years. Unlike other types of products, shutting down service of telephones or data communications of critical networks to upgrade equipment in the telecommunications network is unacceptable. Because service cannot be delayed for an extended period of time in these types of products, certain aspects of the product are designed to support various upgrades without replacing these components for long periods of time (e.g., twenty years). For example, the backplane of a switching fabric, which may include several connectors and multiple traces, cannot be replaced without an interruption in service. Line cards or port cards plug into the backplane, and support data transfer in the switching equipment at predefined rates. Typically, when service is upgraded to increase the operating speed of the switch, the line cards are removed from the backplane, and new line cards are directly inserted into the backplane as direct replacements. Accordingly, the line cards can go through several product cycles to increase the operating speed of the switch (i.e., bandwidth of the switch) without interruption of existing service. However, the backplane must be designed for several cycles of these line cards. Accordingly, it is desirable to design a backplane for a telecommunications switching fabric that supports multiple data transfer rates through various product cycle upgrades.

Backplanes in telecommunications equipment typically include a plurality of electrical connectors. Various types of electrical connectors are well-known in the art. Currently, conductor technology provides about two hundred impedance controlled signals per two inches of vertical board space. For this connector technology, two hundred signals may be coupled to the backplane via a backplane conductor, for every two inches of printed circuit board space. Thus, there is a limitation as to the number connections that a printed circuit board component can make to the backplane. The telecommunications components for the backplane also require ground and power traces that may consume over 30 percent of the remaining connections between the component and the backplane. Therefore, it is desirable to minimize the number of conductors required to implement data transfer via a backplane.

SUMMARY OF THE INVENTION

A cell bus reduces the number of conductors required to transfer data, including the high-speed transfer of data in a telecommunications switching fabric. A cell bus contains a plurality of conductors, Data[X:0], for transmitting information, as well as a cell clock line and a cell sync line. A cell bus interface generates a cell bus frame that includes a plurality of words, "X" bits in length, of both data and control information. The control information comprises, in part, routing information for the data. The cell bus interface transports the cell bus frame on the Data[X:0] conductors of the cell bus. As a result of encapsulating control information into the cell bus frame for transmission on the Data[X:0] conductors, the number of conductors required to transmit data is reduced.

The cell bus of the present invention has application for use in an asynchronous transfer mode (ATM) switching fabric. In one embodiment, a plurality of cell buses are configured in a point to point fashion between a cell routing unit (CRU)/ATM fiber bank interface unit (AFIU) and a plurality of optical line units (OLUs) for bi-directional transfer of ATM cells both "upstream" and "downstream." The cell bus is integrated onto a backplane for the CRU, AFIU and OLUs. The reduction of conductors permits implementation of the cell bus between the CRU/AFIU pair and thirty-two (32) OLUs, using current two (2) millimeter connector technology. The cell bus operates to transfer data at ECR-3, ECR-6, and ECR-12 rates, to support aggregate bandwidths of the switching fabric of 5 Gbps, 10 Gbps, and 20 Gbps, respectively.

BRIEF DESCRIPTION OF THE DRAWINGS

FIG. 1 is a block diagram illustrating one embodiment for a cell bus of the present invention.

FIG. 2 is a block diagram illustrating a broadband network that utilizes the cell bus of the present invention.

FIG. 3 illustrates one embodiment for a broadband fiber bank shelf configuration.

FIG. 4 illustrates one embodiment for a backplane for the broadband fiber bank shelf configuration illustrated in FIG. 3.

FIG. 5 is a block diagram illustrating one embodiment for use of the cell bus of the present invention in a broadband fiber band application.

FIG. 6 is a timing diagram that illustrates the timing of cell bus signals with respect to the cell bus clock.

FIG. 7 illustrates one embodiment for the format of a cell bus frame.

FIG. 8a illustrates one embodiment for the downstream bus header of a cell bus frame.

FIG. 8b illustrates one embodiment for the upstream cell bus header of a cell bus frame.

FIG. 9 is a block diagram illustrating one embodiment for a cell bus interface.

FIG. 10 is a block diagram illustrating one embodiment for clock distribution in the cell bus.

DETAILED DESCRIPTION OF THE PREFERRED EMBODIMENTS

Cell Bus Overview:

FIG. 1 is a block diagram illustrating one embodiment for a cell bus of the present invention. For purposes of nomenclature, the data transport mechanism of the present invention is termed a "cell bus." The "cell" refers to a block of data, such as a cell of data defined by the asynchronous transfer mode (ATM) protocol specification. The "bus" generally refers to a data transport mechanism consisting of a plurality of electrical conductors that transport data between at least two points. Although the cell bus of the present invention is described in conjunction with a point to point data transport mechanism for transferring ATM cells, the present invention is applicable to all types of data transport mechanisms that support various bus or network protocols, such as the Internet protocol (IP), without deviating from the spirit and scope of the invention.

As shown in FIG. 1, the data transport mechanism 100 includes a cell bus 130, one or more cell bus interface(s) (CBI) logic 110, and one or more cell bus interface(s) 120. For purposes of simplicity, only one cell bus interface 110 and one cell bus interface 120 are shown. The cell bus 130 includes, to effectuate data transfer, Data[X:0], cell clock, and cell sync. In one embodiment, the cell bus 130 is bidirectional, such that the Data[X:0] lines transport both transmit data (i.e., data originating from cell bus interface logic 110 "Tx_Data[X:0]"), and receive data (i.e., data originating from cell bus interface 120 "Rx_Data[X:0]"). In one embodiment, Data conductors comprise 8 lines to transport a byte (8 bits) of data. The cell bus of the present invention is also applicable to data transmitted in a single direction (i. e., either transmit or receive data). In general, the CBI logic 110 receives, as input, data, and generates, as output, cell bus frame transactions. In one embodiment, the CBI logic 110 generates cell bus frame transactions from ATM cells. The cell clock provides timing for all bus transactions, and the cell sync provides timing to delineate among cell bus frames on the cell bus 130. The CBI logic 110 may consist of circuits and state machines to generate the cell bus frame transactions. Circuits and state machines to generate the cell bus frames, in accordance with the functions described herein, may be implemented using well known techniques.

The cell bus of the present invention has application for use in data transport for broadband switching applications, such as data transport in telephony switching systems. In one embodiment of a telephony system, the cell bus interface(s) 120 are integrated into line cards or port cards that transmit and receive data "downstream" (i.e., towards end users), and the CBI logic 110 is integrated with switching circuits that couple the data "upstream." The cell bus 130 may be implemented to support a point-to-point connection between a cell bus interface 120 and CBI logic 110 (FIG. 1), or the CBI logic 110 may be coupled to a plurality of cell bus interface 120. In the latter embodiment, each cell bus interface 120 may implement an arbitration scheme to share cell bus 130 resources.

The Data lines on FIG. 1 are encapsulated with a circle to conceptually illustrate the implementation of a cell bus frame 140 on the Data lines. As shown in FIG. 1, a cell bus frame 140 contains four parts: cell data 145, cell payload 150, cell control 155, and check sum 160. In general, the cell bus interface reduces the number of electrical conductors required to transfer data by combining both control and data information on the Data lines during a predefined cell bus frame. Because control lines are eliminated, a number of electrical conductors for the bus are eliminated, thereby reducing the space required to implement the bus. Thus, the data transport mechanism 100 encapsulates control information, typically implemented with additional electrical conductors, as part of the information transmitted across the Data lines on the cell bus 130.

In one embodiment, a cell routing unit of a broad band fiber bank (FIG. 2) includes 13 inches of usable printed circuit board edge. With the current connector technology, the cell routing unit is limited to about 650 signals transferred via the backplane. For these requirements, a cell bus of eight bits requires a maximum cell bus rate (e.g., clocking rate) of 100 megahertz MHz) to support an aggregate bandwidth of a switching fabric of up to 20 Gbps. The cell bus, which transfers data on the backplane of a telecommunications switching fabric, minimizes the number of conductors required. Thus, the number of conductors on a connector is minimized to meet both the high bandwidth requirements and the maximum signal densities of current 2 mm connector technology.

To minimize conductors, a cell bus interface of the present invention encapsulates control information, typically implemented with additional conductors, onto the data transfer conductors. In general, to accomplish this task, a cell bus interface of the present invention utilizes, in a cell bus frame, all the time allotted to transfer data (e.g., a cell), while maintaining the high bandwidth requirements of the switching fabric. As explained fully below, with this cell bus interface configuration, a backplane can support multiple product cycles or generations that support different data rates, up to and including a switching fabric with 20 Gbps aggregate bandwidth.

A Broadband Fiber Bank (BFB) Application

FIG. 2 is a block diagram illustrating a broadband network that utilizes the cell bus of the present invention. In general, the broadband network supports transfer of data for high bandwidth applications, such as the transport of digital broadcast video. U.S. Provisional Application Ser. No. 60/031,898, entitled "Optical Network Unit", filed Nov. 27, 1996; and U.S. Provisional Application Ser. No. 60/031,828, entitled "Broadband Fiber Bank", filed Nov. 27, 1996, which are expressly incorporated by reference, discloses system implementations for broadband applications. By way of example, the broadband network in FIG. 2 includes, at the "upstream" side, an asynchronous transfer mode (ATM) switch 200, and includes, on the "downstream" side of the network, distribution network 205. As used throughout, the "downstream" refers to cell bus transfers originating from a cell routing unit to an optical line unit, and the term "upstream" refers to frame transfers from an optical line unit to a cell routing unit. In one embodiment, the distribution network 205 may comprise a plurality of optical network units (ONUs). For example, a distribution network 205 may comprise a "fiber to the curb" network topology. A more detailed description of OLUs and ONUs is set forth in the document "Litespan® Broadband Full Service Optical Line Unit OC-3 (FOLU3) Functional Design Specification", contained in U.S. Provisional Application Ser. No. 60/031,898.

As shown in FIG. 2, the broadband network includes one or more broadband fiber banks 210. A broadband fiber bank 210 may be located in a central office or in a remote field location. Other broadband fiber banks may be integrated to form a host digital terminal (HDT). In general, the broadband fiber bank 210 distributes broadband ATM cell traffic and telephony time division multiplexed (TDM) traffic from the host digital terminal (i.e., multiple broadband fiber banks) to the downstream distribution network (e.g., optical network units). The broadband fiber bank 210 includes a switching fabric to couple a plurality of optical line units 250, on the upstream side, to a plurality optical line units (OLU) 230 on the downstream side. In one embodiment, the broadband fiber bank 210 contains an ATM switching function with capacities of 5 Gbps, 10 Gbps, and 20 Gbps.

The broadband fiber bank 210 contains one or more cell routing units (CRU) 220. The CRU 220 implements the ATM switching fabric 260. In general, the ATM switching fabric 260 provides point-to-point connections between two optical line units 230. The switching fabric 260 of the CRU 220 includes: a minimum of 5 Gbps of aggregate bandwidth; cell based flow control both upstream and downstream; operation with the same transmit and receive cell clock and cell sync timing on all optical line units 230. The backplane, and corresponding cell bus of the present invention, permit multiple implementations for the cell switching fabric 260 on the CRU 220. In one embodiment, the CRU 220 supports: a S Gbps switching fabric with 8 ECR-12 ports; a 10 Gbps switching fabric with 16 ECR-12 ports; and a 20 Gbps fabric with ECR-12 transfer rates to each OLU.

The CRU 220 contains four ATM fabric ports as shown in FIG. 2. The broadband fiber bank 210 further includes ATM fiber bank interface unit (AFIU) 240. The AFIU 240 interfaces with the ATM switching fabric 260 or the OLUs 230 directly to permit integration of time division multiplex (TDM) signals into the ATM switching fabric 260. The AFIU 240 interfaces to a control unit (not shown) to integrate telephony TDM traffic.

In one embodiment, the broadband fiber bank 210 includes two CRUs 220 per bank, as well as two AFIUs 240. The CRU 220 and the AFIU 240, although physically separate cards on the backplane, form a single logical unit. For this embodiment, the two CRUs 220 and AFIUs 240 are in a 1:1 protected configuration tied to a control bank for TDM telephony traffic. In general, the optical line units (220) base their selection of narrow band TDM traffic to/from AFIUs 240 and ATM traffic to/from CRUs 220 based on the status of control lines (not shown). To minimize power consumption of the broadband fiber bank 210, the inactive CRU 220 operates in a low power mode.

The optical line units 230 contain "n" optical line units. In one embodiment, the optical line units 230 include 32 optical line units (OLUs). All of the OLUs 230 in the broadband fiber bank 210 have identical backplane interfaces for broadband signals. In one embodiment, each OLU 230 functions in either a protected or non-protected configuration. When in a protected configuration, adjacent odd/even slots on the backplane form the protected group. The OLUs are capable of operation at any one of the three cell bus data rates (i.e., ECR-3, ECR-6, and ECR-12). In one embodiment, the CRU 220 allows each group of 4 OLUs (e.g., 8 groups) to operate independently in either a dedicated ECR-3 mode, a shared ECR-12 mode or a dedicated ECR-12 mode. To transfer data at ECR-3, the cell clock frequency is 25 megahertz (MHz). Data transfer at ECR-6 and ECR-12 are clocked at 50 MHz and 100 MHz frequencies, respectively.

As shown in FIG. 2, the cell routing unit 220 includes 8 ATM fabric ports 225. Each port 225 is capable of data transfer at ECR-12 rates. As described fully below, each ATM fabric port 225 supports a cell bus interface for data transport up to a transfer rate of ECR-12. For this embodiment, the optical line units 230 are grouped into 8 groups of 4 cards with each group sharing a logical cell bus (See backplane of FIG. 4). For the broadband fiber bank embodiments, the CRU 220 and AFIU 240 support 32 cell bus interfaces. When operating at ECR-12 rate, the cell bus protocol provides for flexible sharing of the ECR-12 bandwidth over the four corresponding optical line unit cards. When operating in the shared mode, cell routing is based on four bits in the cell header Generic Flow Control ("GFC") field (See FIG. 7) or an additional routing tag.

The broadband fiber bank 210 transfers all ATM cell data in a synchronous fashion. The clock domain between cell clock and SONET clock are only crossed in the physical layer implementations on the OLUs. Note that the ATM byte transfer rate is 53 bytes/2.72 $\mu$s, or approximately a rate of 19.485 mega bytes per second (Mbps). The SONET OC-3 byte clock is 19.44, including SONET overhead. In a SONET physical layer system, the cell bus interfaces do not all operate at total capacity. At the ECR-12 rate, four times the number of bytes may be transferred within one cell clock period symbol.

FIG. 3 illustrates one embodiment for a broadband fiber bank shelf configuration (i. e., a rack mounted broadband fiber bank). As shown in FIG. 3, the CRUs 220 and AFIUs 240 are configured on the center of the broadband fiber bank shelf. Also, four group of OLUs 230, each labeled 270, with eight OLU's per group, are shown emanating from the CRU 220/AFIU 240. Also, for this configuration, bank power supplies 290 are mounted at the end of each of the four OLU groups.

FIG. 4 illustrates one embodiment for a backplane for the broadband fiber bank shelf configuration illustrated in FIG. 3. As shown in FIG. 4, a CRU connector 300 and AFIU connector 310 are mounted near the center of a backplane 305. In one embodiment, the CRU connector 300 and AFIU connector 310 utilize two (2) millimeter (mm) connector technology to maximize the number of electrical connections between the CRU connector 300/AFIU connector 310 and the backplane 305. The physical conductors for each cell bus are fabricated directly on the backplane 305. As shown in FIGS. 3 and 4, the OLUs are organized into eight groups, labeled 320, 330, 340, 350, 360, 370, 380, and 390 on FIG. 4.

Connectors for each optical line unit (OLU) are also shown on FIG. 4. The OLUs "plug" into the backplane 305 via an OLU connector. The OLU connectors on the backplane permit replacement and upgrade of different OLUs, which support different services and data transfer rates, through swapping a new or upgraded OLU with an older OLU in the ONU connectors 400. This permits upgrading the OLUs in a broadband fiber bank without replacing the entire backplane, and therefore doesn't require an interruption in service. The cell clock and cell sync signals, which originate from the AFIU, are distributed throughout the backplane in a point to point fashion. As shown in FIG. 4, the CRU connectors 300, which extends the vertical length of the backplane, has the most constraints regarding the number of connections made from the CRU 300 to the backplane 305. The cell bus of the present invention minimizes the number of connections required to electrically couple the CRU 220 to the backplane 305.

A Cell Bus Interface Embodiment:

FIG. 5 is a block diagram illustrating one embodiment for use of the cell bus of the present invention in a broadband fiber band application. The cell bus is also described in U.S. Provisional Application Ser. No. 60/032,045, entitled "Cell Bus", filed Nov. 27, 1996, which is expressly herein incorporated by reference, and in Appendix A, entitled Litespan®-Broadband ATM Cellbus Interface Specification. For simplicity, FIG. 5 illustrates only a single OLU grouping of "n" OLUs; however eight groups of OLUs may be configured for a broadband fiber bank as illustrated in the embodiments of FIGS. 3 and 4. As shown in FIG. 5, a cell bus 500 couples a plurality of optical line units (OLUs) 230 with the CRU 220 and the AFIU 240. For this embodiment, the cell bus 500 includes: cell clock lines 530, cell sync lines 540, and data lines 550. The cell bus 500 is controlled, on the "upstream" side, by cell bus interface (CBI) logic 520 on CRU 220, one for each OLU. Each OLU 230 includes a cell bus interface 510 that transmits and receives data to and from the cell bus 500 for its respective OLU 230. The cell clock, which provides timing for the entire cell bus, originates on the AFIU 240 from the clock circuit 570. Similarly, synchronization timing to delineate cell bus frames is generated by the sync circuit 580, also originating from the AFIU 240. For this application, the cells bus supports equivalent cell rates of ECR-3, ECR-6, and ECR-12. With data transfer at ECR-3, ECR-6, and ECR-12, the switching fabric 260 of the CRU 220 supports 5 Gbps, 10 Gbps, and 20 Gbps of aggregate bandwidth, respectively.

The cell bus of FIG. 5 supports a direct point to point link between the ATM switching fabric of the CRU 220 (FIG. 2) and each OLU 230. Within each cell bus frame, a complete ATM cell (53 bytes) is transferred across the cell bus. The cell sync signal on the cell sync line 540, which determines or delineates cell bus frame boundaries, is used in conjunction with a cell presence indicator field in the cell bus frame data (FIG. 7) to detect an active ATM cell. For this embodiment, no cell delineation using a HEC field is required. However, a cell bus interface (510, 520), when receiving data, executes HEC checking prior to routing the cell based on cell header information. Idle cell bus frames, cell bus frames without cell data, are explicitly identified by an IDLE bit in the cell bus header data ("CB_header").

For the cell bus embodiment shown in FIG. 5, the cell bus data path width is byte wide and symmetrical (i.e., transmit data "Tx_Data" and receive data "Rx_Data" on transported the data lines 550). The single byte wide and symmetrical data paths optimize the cell bus by utilizing the maximum allowable density on the CRU 220/AFIU 240 connectors while permitting at least a fourfold increase in bandwidth for future revisions of the broadband fiber bank 210. As discussed above, the data lines 550 are wired point to point from the CRU 220 to each OLU 230. However, the CRU 220 may be configured to support a shared mode virtual bus topology for ECR-12 operation. The data lines 550 of the cell bus support equivalent cell rates of ECR-3, ECR-6, and ECR-12. With data transfer at ECR-3, ECR-6, and ECR-12, the switching fabric 260 of the CRU 220 supports 5 Gbps, 10 Gbps, and 20 Gbps of aggregate bandwidth, respectively. As described more fully below, impedance control/GTL driven data paths of the cell bus guarantees robust data transfer at the high cell transfer rates.

Inherently, data originating the distribution network 205 (FIG. 2) for subsequent transfer"upstream", via the OLUs 230, is asymmetric traffic. Asymmetric upstream traffic rates are supported via a cell bus arbitration mechanism, implemented on the cell bus interface 510. Requests for cell bus upstream bandwidth, initiated by the cell bus interface 510, occur via the IDLE bit and the CB_Up header. The requests for cell bus upstream are granted in the cell bus interface 520, via a simple round-robin mechanism, through use of the BPU_u bit in the CB_downstream header set by the cell bus interface 520. When the cell bus operates in ECR-12 mode, the upstream bandwidth is granted in a sequential order to allow a guaranteed ECR-3 upstream rate from each OLU 230 within a group of four OLUs. Also, in the ECR-12 mode, with a 5 Gbps switching fabric, the downstream bandwidth of the cell bus is shared among each group of four OLUs. The downstream "virtual bussing" permits transfer of data to a single OLU at rates greater than ECR-3. This is advantageous for implementations of quad OLUs and OC-12 line units.

Table 1 further describes the signals of the cell bus for the embodiment of FIG. 5.

TABLE 1

| Signal | Description | Source | Logic Level | Value Range |
| --- | --- | --- | --- | --- |
| Cell Clock | CBI clock | AFIU | DPECL | 25 MHZ |
| Cell Sync | Master Cell Sync | AFIU | GTL | 68 clocks |
| Tx_Data[7:0] | Tx Data byte | CRU | GTL | D0-D67 |
| RxData[7:0] | Rx Data byte | OLU | GTL | D0-D67 |

Table 1 provides, for each cell bus signal, the name of the signal(s), a general description of the signal(s), the source of the signal(s), the respective logic level used in signal transmission, and values or ranges for the corresponding signal(s). Note, the cell bus clock value of 25 MHz reflects the frequency of the cell clock on the cell bus backplane. Clock rate multiplication from 25 MHz to 50 MHz and 100 MHz is implemented on OLUs. As shown below in FIG. 10, the clock rate multiplication on the OLUs is implemented through local phase lock loop (PLL) mechanisms on the OLUs to guarantee a glitch free local cell bus clock during protection switching from the CRU 220/AFIU 240.

In one embodiment, the cell bus frame length is 68 bytes. A cell bus frame length of 68 frame bytes @ 25 MHz cell clock provides adequate bandwidth to support the required per ATM fabric port cell transfer rate of ECR-3. Thus, for this embodiment, an active downstream cell sync signal occurs every 68 cell clock intervals, for a total cell bus frame duration of 40 nanoseconds (ns). For this embodiment, the 68 bytes for cell bus frame synchronization is based on the operation of the switching fabric of the CRU 220. Specifically, the switching fabric 260 (FIG. 2) sends and receives a new cell on all 32 cell bus interfaces (510) in 2.72 microseconds ($\mu$s) (i.e., 68* 40 ns=2.72 $\mu$s). Therefore, the ATM switch fabric 260 delivers cells in a "non-blocked" fashion at the ECR-3 rate. In other embodiments for different switching applications, switching fabrics with higher aggregate bandwidths permit shorter durations of time for cell bus frames, thereby allowing for transmission of a greater number of bytes per cell bus frame.

The total cell bus frame byte count is the sum of the cell bus header information, the expansion frame bytes, currently unused, and the ATM cell data (53 bytes), for a total of 68 bytes per cell bus frame. In one embodiment, the first cell bus frame byte, aligned with the falling edge of a downstream cell sync signal, is used for cell bus header information. Thereafter, the ATM cell data appears on the cell bus 14 cell clock cycles after the cell bus header byte. Thus, for this embodiment, frame bytes 1–14 are unused. The upstream cell sync signal is synthesized by the QBIC logic on the CRU 220 and on the QUIC on the OLU 230 (See FIG. 9). In one embodiment, the upstream cell sync signals proceed the downstream cell sync signals by 10 cell bus clock cycles (25 MHz @ ECR-3, 50 MHz @ ECR-6, and 100 MHz @ ECR-12). Because the upstream cell sync proceeds the downstream cell sync, the cell bus, in shared mode, efficiently supports upstream arbitration.

To transmit data upstream, an OLU 230 posts an upstream request, and subsequently expects a grant from the CRU 220 in the downstream header of a subsequent cell bus frame. If a grant occurs, the cell bus interface 510 on the OLU 230 drives the cell bus four cell bus cycles later. If the cell bus interface 510 on the respective OLU 230 does not respond accordingly, the CBI logic 520 on the CRU 220 discards the payload and considers the cell bus frame as a HEC error. Note that if an OLU 230 does not receive a grant in a cell bus frame subsequent to the request, that OLU has two more cell bus frame opportunities to transmit data in order to maintain operation within the upstream bandwidth requirement.

FIG. 6 is a timing diagram that illustrates the timing of cell bus signals with respect to the cell bus clock. As shown in FIG. 6, the cell sync signal and the receive data, Rx_Data [7:0], signals are sampled on the rising edge of the cell bus clock. Also, the transmit data Tx_Data[7:0] is output from the ATM switching fabric 260 on the rising edge of the cell clock. The first byte (CB_header) of a cell bus frame is output during the cell clock cycle that the cell sync is sampled. In ECR-3 mode, new data appears on the data lines of the cell bus every cell bus clock cycle. In the ECR-3 mode, the first data byte of the ATM cell is delayed by 14 cell bus clock cycles (i.e., 560 ns @ 25 MHz). In ECR-6 mode, cell bus frame data changes twice within a single cell clock cycle. Data byte "0" of the ATM cell is delayed by 14 synthesized clock cycles (synthesized on the OLU) for a total delay of 280 ns @ 50 MHz. In the ECR-12 mode, the data field changes four times within a single cell bus clock cycle. In this mode, byte "0" of the ATM cell is delayed by 14 synthesized cell clock cycles, for a total delay of 140 ns @ 100 MHz. The timing diagram of FIG. 6 depicts operation in the ECR-3 mode from the prospective of the Universal Test and Operation Parallel Interface (UTOPIA)(See block 400, FIG. 9). The frequency of the cell clock is 25 MHz for operation in the ECR-3 mode (i.e., period of 40 ns). As shown in the timing diagram of FIG. 6, the "up-sync" signal on the cell sync line (540) transitions from a high to low state to indicate an upstream cell bus frame transaction on the cell bus. Fifty two (52) clocks later, a high to low transition of the cell sync line, by the "implied down-sync" signal, initiates the downstream cell bus frame transaction. The active frame bytes, D0–D67, for an upstream cell bus frame transaction are effectuated by the "up-data" signals. Also shown in FIG. 6, the active frame bytes, D0–D67, for an downstream cell bus frame transaction are effectuated by the "down-data" signals.

FIG. 7 illustrates one embodiment for the format of a cell bus frame. As shown in FIG. 7, for this embodiment, the cell bus frame consists of 68 bytes. The first 13 bytes, bytes 0–12, are unused. Control information is provided on the subsequent four bytes. Specifically, the first four bits of byte 13 specify a virtual path identifier ("VPI"), and the most significant bits of byte 13 signify generic flow control user network interface ("GFC (UNI)")/VPI Network to Network Interface ("NNI"). Byte 17, the HEC field, is based on the ATM Specification. The subsequent 48 bytes define the data for an ATM cell. Byte 66 contains the cell bus header information (i.e., control information). Finally, the last byte of the cell bus frame, block check sum, provides a check sum to verify the accuracy of the data. Preferably, the block check sum scheme is simple enough for easy implementation in the cell bus interface (i.e., QBIC 460 and QUIC 470, see FIG. 9). The cell bus interface 510 performs the calculation and verifies the check sum at a rate of 100 M byte per second, when operating in ECR-12 mode. The QBIC 460 and the QUIC 470 (FIG. 9) maintain the block check sum counters for interpretation by a controlling respective processor for an OLU implementation. Occasional burst errors may be acceptable in that no immediate protection feedback is triggered. The block check sum mechanism is intended to flag faulty cell bus operation, and not to invalidate corrupted cells. The block check cell sum mechanism may be used to protect switch CRUs 220 or invalidate a specific OLU 230.

FIG. 8a illustrates one embodiment for the downstream bus header of a cell bus frame. For this embodiment, the downstream cell bus header is one byte. OLUs (230) only responds to the downstream cell bus header information if it appeared on an active cell bus frame. The most significant bit, the IDLE_D bit, indicates, when "0", that an AIM fabric port 225 has valid cell data for an OLU 230. If the IDLE_D is set, "IDLE_D=1", either no CRU 220 is present (i.e., disabled in protect mode, or the fabric port 225 has no valid broadband cell data for the OLUS). The next two fields, NU, are designated as not currently used. The /BP_U bit, back pressure up, when "0", indicates that an upstream flow control is asserted by the CRU to all of the OLU physical ports (up to four OLUs). The /BP_U bit is used to acknowledge the "implied request of the IDLE_UBit." When a CRU 220 is not present, the /BP_U is "1" at the OLU 230. The four least significant bits, RT_D (3:0), the routing tag down field, enables port steering to OLUs without consumption of either GFC or VPI bits. In one embodiment, the RT_D (3:2) are used to select the OLU port in both dual OLU and quad OLU applications. The RT_D (1:0) are used to select the particular OLU slot, in a group of four, when the cell bus is operating in the shared cell bus mode.

FIG. 8b illustrates one embodiment for the upstream cell bus header of a cell bus frame. The most significant bit, the IDLE_U, when "0", indicates that the associated ATM fabric port 225 has valid cell data for the CRU 220. A cell bus interface (510) on an OLU 230 does not place the associated physical cell data into a cell payload until the grant, indicated by /BP_U=1, from the CRU 220 during the next cell bus frame. A set IDLE_U bit indicates either no OLU 230 is present or none of the physical ports 225 have valid broadband cell data destined for the CRU. The next two bits, labeled NU, are not used. The /BP_D, the back pressure down bit, when set to "0", indicates that downstream flow control is asserted by any of the OLU physical ports 225 or by an OLU TDM format function. A non-present OLU returns a BP_D of 1. The four least significant bits, routing tag upfield, RT_U [3:0], are used to enable port steering from OLUs (230) without consumption of either the control GFC or VPI bits. For this embodiment, RT_U [3:2] are used to identify the source OLU 230 port in both dual and quad OLU applications. The RT_U [1:0] are used to identify the source OLU 230 slot when operating in the shared cell bus mode.

FIG. 9 is a block diagram illustrating one embodiment for a cell bus interface. FIG. 9 illustrates, with arrows, the symmetric data path between CRUs 220 and OLUs 230. As shown in FIG. 9, the CRU 220 includes a port interface (PIF) device 400, a downstream cell bus interface controller (DBIC) 420, an upstream cell bus interface controller (UBIC) 410, and GTL buffers 430. The UBIC 410 operates as an interface between the PIF 400 and the cell bus GTL buffers 430. In one embodiment, the UBIC 410 is implemented in CPLD logic, with an operating voltage of 5 volts at the core and 3.3 volts for input/output. The GTL buffers 430 may be implemented as part of an application specific integrated circuit (ASIC) with the DBIC 420 and/or UBIC 410, or may be implemented external to the DBIC 420.

The UBIC 410 is designed to function with the PIF 400 at ECR-3, as well as ECR-12 rates. The PIF 400, similar to a UTOPIA interface, operates as 25 MHz. The UBIC 410 synthesizes the cell clock for the data rate adaptation to the cell bus (i.e., synthesizes the cell clock for 50 MHZ and 100 MHZ cell clock frequencies in ECR-6 and ECR-12 rates, respectively.) The data transfer modes are programmed by a microprocessor on the CRU 220. The UBIC 410 accepts either four ECR-3 inputs from the GTL buffers 430, 8 bits wide @ 25 MHz, or an ECR-12 input from the GTL buffers 430, 8 bit wide @ 100 MHz. The UBIC 410 multiplexes the signals to four ports on the PIF (ECR-3, UTOPIA I) or one port (ECR-12, UTOPIA II).

The DBIC 420 operates as an interface between the PIF 400 and the GTL buffers 430. Similar to the UBIC 410, the DBIC 420 is implemented in CPLD logic with a core operating voltage of 5 volts, and an I/O voltage of 3.3 volts. Also, the GTL buffers 430 may be integrated with the DBIC 420. The DBIC 420 is designed to function with the PIF 400 ECR-3 as well as ECR-12 modes, in a manner similar to that discussed above in conjunction with the UBIC 410. The DBIC 420 accepts either four 8 bit wide ECR-3 inputs from the PIF 400 or a 32 bit wide ECR-12 input from PIF 400, and in turn distributes these to four 8 bit wide GTL buffers 430 at ECR-3 or ECR-12, respectively.

As shown in FIG. 9, an OLU 230 includes a quad cell bus interface controller (QBIC) 470, a quad unit interface controller (QBIC) 460 and a set of GTL buffers 440 (one for each CRU 220). The QBIC 460 operates as an interface between the QUIC 470 and the GTL buffers 440. The QBIC 460 performs both upstream and downstream interface functions for the corresponding OLU 230. The functions are similar to the combination of ¼ of both a UBIC 410 and a DBIC 420 on the CRU 220. In one embodiment, the QBIC is implemented in CPU) logic at a 5 volt core operating voltage and a 3.3 volt I/O operating voltage. The QBIC 460 may be implemented in a field programmable gate array (FPGA); however, due to the speed of these devices, the GTL buffers are implemented externally.

FIG. 10 is a block diagram illustrating one embodiment for clock distribution in the cell bus. In a preferred embodiment, all cell bus distribution traces are differential PECL, and length equalized up to the PLL clocks synthesis functions. The clocks synthesis functions are also positioned near the QBIC 460 and QUIC 470. As shown in FIG. 10, clock synthesis, for the ECR-6 and ECR-12 rates, occurs on the CRU 220 via clocks synthesis 560 on each cell bus interface. On the OLU 230, clocks synthesis is performed on the phase lock loop (PLL) synthesizer 610. On the active AFIU 240, the PLL synthesizer 510 generates the 25 MHz cell bus clock, and PECL buffers (n) 530 drive the cell bus clock signal on the backplane. A PECL multiplexer 600 is used to control the PLL synthesizer 610.

In one embodiment, the cell bus clock traces are equal length and Z or impedance controlled. The cell bus data traces are also equal length and Z-controlled. Accordingly, the clock distribution controls the intrinsic parameters of trace length, trace impedance, crosstalk, as well as bus termination placement and buffer placement.

Although the present invention has been described in terms of specific exemplary embodiments, it will be appreciated that various modifications and alterations might be made by those skilled in the art without departing from the spirit and scope of the invention.

APPENDIX A

Litespan®-Broadband ATM Cellbus Interface Specification

Litespan®-Broadband
ATM Cellbus
Interface Specification

Doc No:  EH0187v1.3

Doc Type:  Arch

Abstract:  This document provides a specification of an ATM-based backplane interface to be used in the Litespan Broadband products. This interface is defined to meet the objective of optimum pin count for the back plane connectors so that the back plane design can last the entire life cycle of the product.

Revision History:

| Ver | Date | Author(s) | Changes from Previous |
|---|---|---|---|
| 1.0 | 2/1/96 | J. Dove | Release 1 Draft |
| 1.1 | 4/1/96 | J.Dove | Updated acronyms |
| 1.2 | 5/28/96 | J.Dove | Altered Cellbus headers and timing |
| 1.3 | 11/21/96 | J.Dove | Altered Cellbus headers and timing |
| 1.4 | 7/23/97 | J Dove | Altered Cellbus headers to support BMU-ASIC use |

Approvals:

| Title | Date | Signature |
|---|---|---|
| Author | | |
| Supervisor | | |
| Engineering Director/VP | | |
| Product Management | | |
| Quality Assurance | | |

COMMUNICATIONS

Access Systems Group Proprietary Data

This controlled document is the property of DSC Communications Corporation (DSC). Any duplication, reproduction, or transmission to unauthorized parties without the permission of DSC is prohibited.

Litespan is a registered trademarks of DSC.

Copyright©1996 DSC, ALL RIGHTS RESERVED

Litespan-2000 Engineering - Document Template
Optional Subtitle

DSC Access Products Proprietary Data

Revision History Continued

Access Products - Document Template
Optional Subtitle

TABLE OF CONTENTS

1. Introduction ........................................................................................................................ 1
2. Related Documents ........................................................................................................... 1
3. Objectives ........................................................................................................................... 1
4. Assumptions ....................................................................................................................... 1
5. Signals ................................................................................................................................. 1
6. Timing ................................................................................................................................. 3
   6. 1 Data Path ..................................................................................................................... 3
   6. 2 Clock Distribution ...................................................................................................... 5
7. Data Format ....................................................................................................................... 6
   7.1 The Downstream Cellbus Header ............................................................................. 8
   7.2 The Upstream Cellbus Header .................................................................................. 9
8. Usage ................................................................................................................................... 9
   8.1 The UBIC Device ........................................................................................................ 11
   8.2 The DBIC Device ........................................................................................................ 11
   8.3 The QBIC Device ........................................................................................................ 11

DSC Access Products Proprietary Data

**LITESPAN-Broadband ATM Cell bus Interface
Architectural Specification**

1. Introduction

This document describes the ATM cell interface specification called CBI which is used in the system backplane in the LS BB 2000 Broadband Fiber Bank, Broadband Channel Bank and various derivatives of the Broadband ONU.

2. Related Documents

LS BB System Architecture

3. Objectives

The new interface is defined to satisfy the following objectives:

- Optimum pin count on the backplane to meet complete product life cycle.

- Upgradeability of an ECR-3 interface to an ECR-6 or ECR-12 interface without increasing the backplane clock speed. However; the data transfer rate will increase respectively.

4. Assumptions

- The interface supports a direct point-to-point link between the ATM fabric/multiplexer and each of the line interface cards (or port cards) when used in a BFB. Multiple line interface cards may physically share a cellbus in the BB ONU and BCB implementations.

- Complete ATM cell (53 B) is transferred across the interface.

- No cell delineation using HEC field is needed. The cell boundaries are explicitly determined by a Cell SYNC signal and a cell presence indicator field in the data. The HECs are generated and checked upon exit and entry on the Line Units in the Physical Layer devices. A Block Check sequence is generated and checked at either end of each Cellbus to guarantee Cellbus frame integrity.

- Idle cells are explicitly identified by the Idle bit in the CB_header.

- The backplane interface device on the port card should handle protection switching from the Active / Protect CRU/ABIU pairs.

- The clock for the interface is distributed from a central source (AFIU) in a point to point fashion in a BFB. The clock distribution in BB ONU and BCB implementations may use point to multi-point distribution.

- The CRU switch fabric must provide at least 5 Gbps of aggregate bandwidth, allow Cell based flow control in both in/out directions, allow operation with the same transmit and receive Cell clock and Cell Sync timing on all 32 line card interfaces.

DSC Access Products Proprietary Data

LITESPAN-Broadband ATM Cell bus Interface
Architectural Specification

5. Signals

The Cellbus Data path width and rate is always byte wide and symmetrical. This configuration seeks to optimize maximum allowable pin density on the CRU/AFIU and still permit a fourfold increase in broadband bandwidth in future revisions. The data paths are wired point-to-point (CRU to Line Unit). However; the CRU can be configured to support a "virtual bus" topology when ECR-12/shared mode is used.

The data paths are capable of supporting Equivalent Cell Rates of ECR-3, ECR-6, ECR-12. This permits a symmetrical CRU fabric to be designed at 5Gbps, 10GBbps, and 20Gbps of aggregate bandwidth ,respectively. The impedance controlled / GTL driven data paths of the CBI will guarantee robust data transfer at these rates.

Assymetrical upstream traffic rates are supported via the Cellbus arbitration mechanism. Requests for Cellbus upstream access (via the IDLE bit in the CB_Up header ) must be granted in an equitable fashion (via the BPU bit in the CB_Downstream header) by the CRU.

Release 1 development will use a simple round-robin mechanism. When the CBI is run in ECR-12 mode , upstream bandwidth is granted (sequentially) to allow a guaranteed ECR-3 upstream rate from each Line Unit within a group of four . In this mode , with a 5 Gbps fabric (as in Release 1), the downstream bandwidth is also shared amongst each group of four line unit slots. The downstream "virtual bussing" will allow more than an ECR-3 rate to be delivered to a single line unit. Specifically ; this is useful in the case of Quad OLUs and OC-12 Line Units.

The release 1 CRU will allow each group of 4 BFB slots (8 groups) to operate independently in either dedicated ECR-3 mode or shared ECR-12 mode. All release 1 Line Units must be capable of operation at any one of the three CBI data rates. Note that ECR-6 mode must be supported by the line units. However; release 1 CRUs will only support ECR-3 and ECR-12 (shared) modes of operation.

The CBI signals are described in the following table.The Cellbus signals are distributed by both the CRU and AFIU. This is required since the CRU alone does not have the connector capacity for the required 33 Cellbus interfaces.

The clock signal can alternately be implemented using Single ended or Differential GTL signal. The BRX and BCB will use this method.

| Signal | Description | Source | Logic Level | Value Range |
|---|---|---|---|---|
| Cell Clock | CBI clock | AFIU | DPECL | 25 MHz |
| Alternate Cell Clock | BRX/BCB clock | BRX/ABCU | DGTL | 25 MHz |
| Cell Sync | Master Cell Sync | AFIU | GTL | 68 clocks |
| Tx_Data[7:0] | Tx Data byte | CRU | GTL | D0-D67 |
| Rx_Data[7:0] | Rx Data byte | OLU | GTL | D0-D67 |

DSC Access Products Proprietary Data

**LITESPAN-Broadband ATM Cell bus Interface
Architectural Specification**

6. Timing

The Cellbus is designed to support a CRU with aggregate bandwidth from 5 Gbps to 20 Gbps. (ECR-3 to ECR12 per interface) Current connector technology provides about 200 impedance controlled signals per 2 inches of verticle board edge. The CRU (the most signal intensive circuit pack in the BFB) provides about 13 inches of usable board edge. This constrains CRU i/o to about 650 usable signal i/o. Conservative signal return grounds and power feeds consume > 30% of the remaining interconnect Because of the bandwidth requirements and the maximum signal densities of the current 2mm connector technology, a maximum Cellbus rate of 100 Mhz @ 8 bits is selected. Timing margins are extremely tight. Therefore; both the data path timing and the Cellbus clock distribution methodolgy will be discussed in the following paragraphs.

Cellbus Rates will be limited to < 50Mbytes per Second operation in BB ONU and BCB implementations. The performance is limited due to the use of non-impedance controlled DIN-96 Line Unit connectors and Point-to-Mulitpoint and Mu;tipoint-to-point bussing.

6. 1 Data Path

The cell clock rate is always 25Mhz on the backplane. Clock rate multiplication from 25Mhz to 50 or 100Mhz must be provided on the Line Unit assemblies. This feature is acceptable , since local PLL mechanisms need to be present on Line Unit assemblies to guarantee a glitch free local Cellbus clock during CRU/AFIU protection hand-off. Upon initialization all CRU The Downstream Cell Sync which will occur every 68 cell clock intervals will alway be 40ns in duration. The value of 68 for frame synchronization was selected to closely match the operation of the CRU's switch fabric. The byte aligned with the rising edge of Downstream Sync is used for CBI header information. The ATM cell data then appears on the Cellbus 14 clock cycles after the CBI header byte. The bytes 1 thru 14 are thus unused. The total byte count :header + unsued + atm data equals 68.

The Upstream Cell Sync signal must be synthesized by logic on the CRU (QBIC) and the Line Units (QUIC). The Upstream Cell Sync signals will precede the Downstream Cell Sync signals by 10 synthesized clock cycles (25Mhz @ ECR-3, 50Mhz @ ECR-6, 100Mhz @ ECR-12). This allows the Cellbus (in shared mode) to efficiently support upstream arbitration.

A Line Unit posting an upstream request expects a grant from the CRU in a subsequent Downstream header. If a grant occurs , the selected line unit's CBI should drive the bus 4 cycles later. If the line unit's CBI does not respond accordingly , the CRU should discard the payload due to an HEC error. If a particular line unit does not receive a grant in this frame , it will have 3 more frame opportunities to do so.

The cell sync count of 68 @ 25Mhz provides just enough bandwidth to support the required per port cell transfer rate of ECR-3. The Switch fabric can send and receive a new cell on all 32 CBIs (in a BFB) in 2.72uS (68 * 40ns = 2.72us). Therfore; the Switch fabric can only deliver cells in a non-blocked fashion at this rate. The CBI can send and receive cells at the exact same maximum rate. The BFB will transfer all cell data in a synchronous fashion. The clock domains between Cell clock and Sonet Clock are only crossed in the Physical layer devices on the Line Units.

Note that the ATM byte transfer rate is 53bytes / 2.72uS or ~19.485Mbyte/S . The Sonet (OC-3) byte clock is 19.44. (this includes SONET overhead). In a SONET Phy layer system,

DSC Access Products Proprietary Data

LITESPAN-Broadband ATM Cell bus Interface
Architectural Specification the CBIs can not be kept totally full. At ECR-12 rate, 4 times the bytes can be transferred within one cell clock period.

Figure 2 shows the relative bit level timing of the data and sync signals with respect to the clock signal. The sync and the receive data are sampled on the rising edge of the clock. The transmit data is output from the fabric on the rising edge of the clock. The first byte (CB_Header) of the cell bus is output during the clock cycle the Cell Sync is sampled.

In ECR-3 mode the data field will change 1 time within one clock cycle. The ATM_d0 byte will be delayed by 14 Cellbus clock cycles @ 25Mhz = 560ns.

In ECR-6 mode the data field will change 2 times within one clock cycle. The ATM_d0 byte will be delayed by 14 synthesized clock cycles @ 50Mhz = 280ns.

In ECR-12 mode the data field will change 4 times within one clock cycle. The ATM_d0 byte will be delayed by 14 synthesized clock cycles @ 100Mhz = 140ns.

The following timing diagram shows the ECR-3 mode of operation "as seen at the PIF's Utopia interface". The other two modes of operation can be extrapolated using the above information.

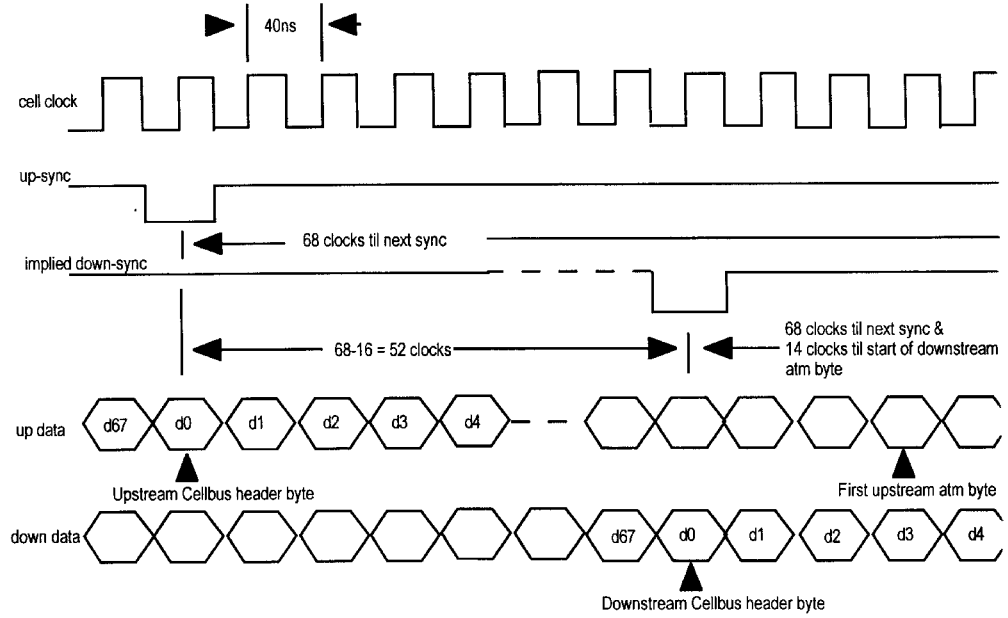

Figure 2. Cell Bus Interface Signal Timing

DSC Access Products Proprietary Data

**LITESPAN-Broadband ATM Cell bus Interface
Architectural Specification**

6. 2 Clock Distribution

See Figure 3. for the BFB's Cellbus clock distribution network.

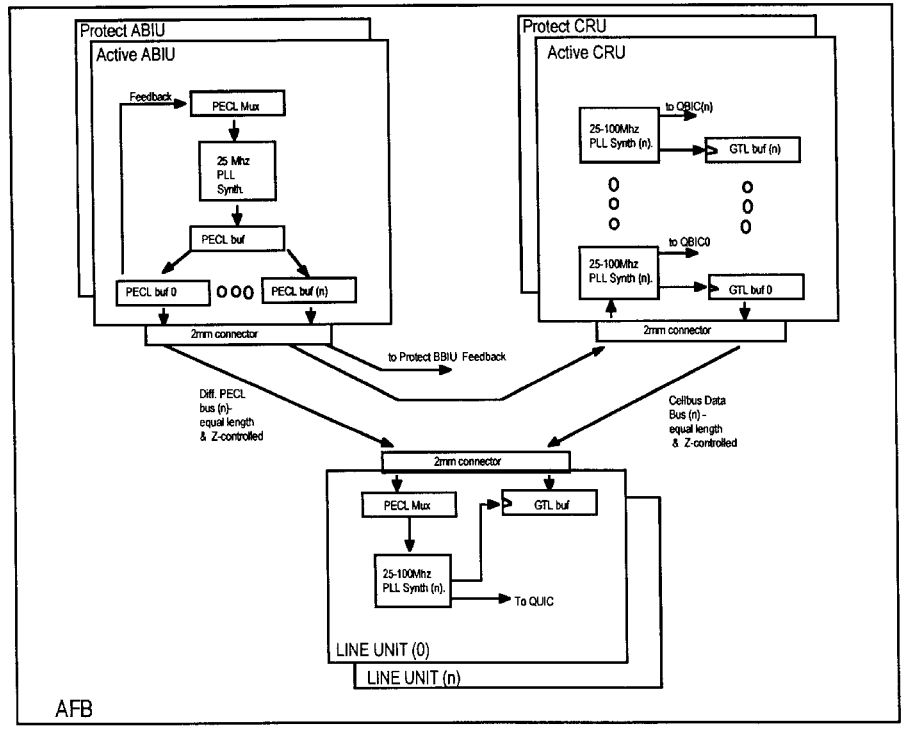

Figure 3. Cellbus Clock Distribution

All Cellbus clock distribution traces are differential PECL and length equalized up to the PLL clock synthesis functions. The clock synthesis functions are also positioned near each QUIC and QBIC device. This topology provides improved signal symmetry.

DSC Access Products Proprietary Data

LITESPAN-Broadband ATM Cell bus Interface
Architectural Specification

The following table shows the estimated intrinsic skew budget for the BFBs Cellbus Clock distribution network. Since the budget is so low, extreme attention must be placed upon controlling the extrinsic parameters such as : trace length, trace impedance, crosstalk , termination placement and buffer placement.

| Function | min. delay (ns) | max. delay (ns) | delay delta |
|---|---|---|---|
| Amp Z-PAK connector (*4) | 0.00 | 0.40 | 0.40 |
| 100e111 (1:9 Pecl buff, inter comp.) | 0.38 | 0.68 | 0.30 |
| 100e457 (triple 2:1 Pecl Mux) | 0.37 | 0.65 | 0.28 |
| mpc951 PLL buffer | 0.00 | 1.00 | 1.00 |
| SN74GTL16922 or GTLE16612 | | | |
| clk to out | 1.00 | 5.50 | 6.60 |
| setup to clk | 2.10 | | |
| Synthesized Cellbus Clock duty cycle: | | 10.00 | |
| Delay Total: | | | 8.58 |
| Delay margin Total: | | | 1.42 |

7. Data Format

The following section describes the data format used for the Cellbus Interface. Data is transferred as byte-wide data in both directions.

The first byte transferred down the Cellbus and deliniated by the Downstream Cell Sync signal is the Cellbus Header. The Cellbus header occurs every 2.7us (in the ECR-3 mode).

In ECR-12 mode, a new Cellbus header is sent over the Cellbus in either direction every 17 cell clock cycles (.68 uS) or at 4 times the ECR-3 rate. The Data bits are updated every 10ns @ 100Mhz.

Note that 13 of the Cellbus bytes are unused. This allows frame allignment with the CRU's switch fabric. It also allows pipelined upstream request/grant sequences when the CBI is operated in "shared mode". The unused bytes may be used for future feature set ehancements.

Data byte 15 is used to transport a Block Check Sum. The BCS is the longitudinal odd parity of the cellbus data block. The block begins with the Cellbus frame data starting with the 16th byte of the previous frame and ends with the 14th byte of the current frame. Note that the Cellbus header is included in the calculation. The BCS calculation includes the unused bytes which will be set to "FF hex" in Release 1.

DSC Access Products Proprietary Data

**LITESPAN-Broadband ATM Cell bus Interface
Architectural Specification**

The BCS is kept simple to ease implementation in the QBIC and the QUIC, which must perform the calulation and verify it at a stream rate of 100Mbyte/s (ECR-12 mode). The QBIC and the QUIC must maintain BCS check counters for interpretation by the respective processor. Since extremely occasional burst errors may be acceptable (not cause immediate protection fallback), failure thresholds will be determined by firmware. This mechanism is intended to flag faulty Cellbus operation "not to invalidate corrupted cells". This mechanism may be used by firmware to protection switch CRUs or invalidate a specific OLU. The Cellbus data sequence appears in Figure 4.

In BCB/BB-ONU implementations, the BCS in the upstream cellbus should be gated with the Idle_U bit in the upstream header. This is required, since Line units share a common upstream bus and do not always drive the bus or BCS field. As opposed to the BFB,were each bus is point-to-point wired and can be expected to drive the bus if present and functional.

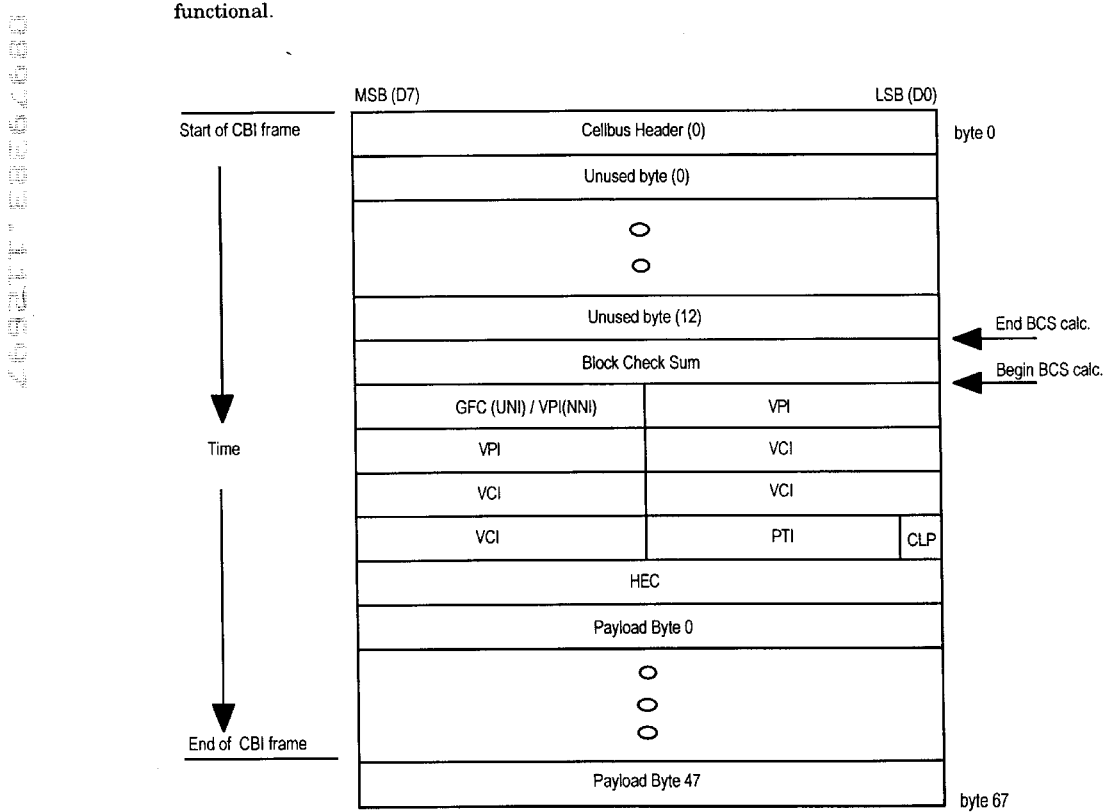

Figure 4. The Cellbus data format

DSC Access Products Proprietary Data

LITESPAN-Broadband ATM Cell bus Interface
Architectural Specification

7.1 The Downstream Cellbus Header

The format of the Downstream CB_Header (one byte) appears as follows: Note that the Line unit should only respond to these signals if they appear on the active Cellbus. The Protect Cellbus should be ignored. Note that Downstream refers to Cellbus transfers from the CRU to the Line Unit.

| MSB | | | | | | | LSB |
|---|---|---|---|---|---|---|---|
| IDLE_D | nu | nu | /BP_U | RT_D3 | RT_D2 | RT_D1 | RT_D0 |

IDLE_D - IDLE_D = 0 when the switch port has valid cell data destined towards the OLU. If the Idle bit = 1, either no CRU is present, is disabled (protect mode) or the port has no valid broadband cell data destined for the OLU(s).

nu - not currently used.

/BP_U- Back Pressure Up = 0 when upstream flow control (halt upstream cell traffic) is asserted by the CRU to all of the OLU physical ports (up to 4). This bit is used to acknowledege the "implied Request of the IDLE_U bit. A non-present CRU results in a BP_U = 1 at the OLU. T

BCB/BB-ONU implementations: This bit is used in conjunction with the RT bits to control upstream (from line unit) arbitration.

RT_D(3:0) - Routeing Tag Down field, reserved for future CRU Release to enable Port Steering to OLUs without consumption of either GFC or VPI bits. R1 OLUs support this mode ;however, R1 CRUs do not.
 RT_D(3:2) are used to select the OLU Port in DOLU and QOLU applications.
 RT_D(1:0) are used to select the OLU Slot in "Shared Cellbus mode".

BCB/BB-ONU implementations: These bits are used in conjunction with the /BP_U bit to select 1 of 16 line units which share the same logical/physical upstream cellbus. The line units must be "told" thier appropriate slot addresses via provisioning over the per slot Subscriber Busses.

DSC Access Products Proprietary Data

LITESPAN-Broadband ATM Cell bus Interface
Architectural Specification

7.2 The Upstream Cellbus Header

The format of the Upstream CB_Header (one byte) appears as follows: Note that only the Active CRU should respond to these signals. Note that "Upstream" refers to Cellbus transfers from the the Line Unit to the CRU.

| MSB | | | | | | | LSB |
|---|---|---|---|---|---|---|---|
| IDLE_U | nu | nu | /BP_D | RT_U3 | RT_U2 | RT_U1 | RT_U0 |

IDLE_U - IDLE = 0 when the associated Physical port has valid cell data destined towards the CRU. The OLU will not place the associated Phy's cell data into the cell payload until a Grant ( /BP_U = 1) from the CRU for that port is seen in the next or subsequent cell frame. If the Idle bit = 1, either no OLU is present or none of the physical ports has valid broadband cell data destined towards the CRU.

nu - not currently used.

/BP_D- Back Pressure Down = 0 when downstream flow control is asserted by any of the OLU physical ports or by the OLU TDM Format function. A non-present OLU returns BP_D = 1.

RT_U(3:0) - Routeing Tag Up field, reserved for future CRU Release to enable Port Steering from OLUs without consumption of either GFC or VPI bits. R1 OLUs support this mode ;however, R1 CRUs do not.
RT_U(3:2) are used to identify the source OLU Port in DOLU and QOLU applications.
RT_U(1:0) are used to identify the source OLU Slot in "Shared Cellbus mode".

BCB/BB-ONU implementations: These bits are used by up to 4 line units to post requests for upstream access. Each bit is assigned to a single slot. This is permitted, since GTL buffers can be wire-ORd together. Ie. All bits pulled low during the up_header time-slot indicates that all 4 line units on a common Multipoint to point bus require upstream access. The Cellmux function on ,ie. the BMU, can chose to use this information or not to grant access to requesting units. Generally, these bits can be ignored when each Line Unit rate requires more than 1/32 of the available total upstream bandwidth. In this "low rate" upstream environment simple Time slot allocation can be used via the /BP_U and RT_D bits.

8. Usage

The cell bus interface between the CRUs and a BFB Line Unit is shown in Figure 5. The diagram shows the data paths and the UBIC, DBIC ,QBIC and QUIC devices as used in the BFB. Typical BFB Line Units wil be the QOLU3, AOLU3 etc.

DSC Access Products Proprietary Data

LITESPAN-Broadband ATM Cell bus Interface
Architectural Specification
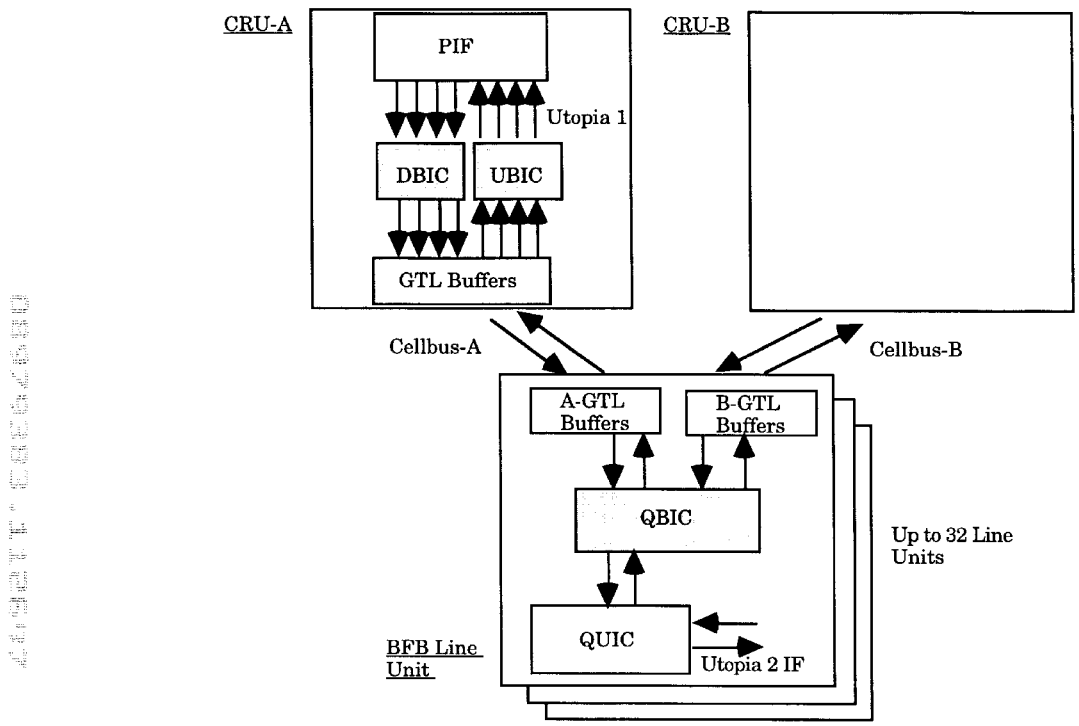
Figure 5. Backplane Interface Between the CRU and Line Unit
DSC Access Products Proprietary Data

LITESPAN-Broadband ATM Cell bus Interface
Architectural Specification

8.1 The UBIC Device

The Upstream cellbus Interface controller (UBIC) device is needed on the CRU as an interface between the Port InterFace (MMC-PIF) device and the cellbus GTL buffers. This device will be implemented in CPLD logic for release 1 @ 5V core /3.3V_IO. External GTL buffers will also be used in Release 1. In a follow on cost reduction effort this function will be integrated into hard ASIC with both buffers, UBIC, DBIC.and will operate entirely at 3.3V.

The UBIC is designed to function with the PIF's ECR-3 as well as the ECR-12 mode. The PIF's Utopias-like ports always will operate at 25Mhz. The UBIC must handle the data rate adaptation to the Cellbus. These modes will be programmed by the CRU's microprocessor.

The UBIC accepts either four ECR-3 inputs from the backplane GTL buffers (8 bits wide @ 25Mhz) or an ECR-12 input from the GTL backplane buffers (8-bit wide @ 100Mhz). It then multiplexes these to a PIF's four (ECR-3, 8 bits wide) ports or an (ECR-12,32 bits wide) port respectively.

8.2 The DBIC Device

The Downstream cellbus Interface Controller (DBIC) device is needed on the CRU as an interface between the Port InterFace (MMC-PIF) device and the cellbus GTL buffers.This device will be implemented in CPLD logic for release 1 @ 5V core /3.3V_IO. External GTL buffers will also be used in Release 1. In a follow on cost reduction effort this function will be integrated into hard ASIC with both buffers, DBIC, UBIC and will operate entirely at 3.3V.

The DBIC is designed to function with the PIF's ECR-3 as well as the ECR-12 mode. The PIF's Utopias-like ports always will operate at 25Mhz. The UBIC must handle the data rate adaptation to the Cellbus. These modes will be programmed by the CRU's microprocessor.

The DBIC accepts either four ECR-3 inputs from the PIF (8 bits wide) or an ECR-12 input from PIF (32-bit wide ) . It then distributes these to four  8 bit wide,GTL backplane buffers (ECR-3 @ 25Mhz) or (ECR-12 @ 100MHZ) respectively.

8.3 The QBIC Device

The Quad cellbus Interface Controller (QBIC is needed on Line Units as an interface between the Quad Unit Interface Controller (QUIC) and the cellbus GTL buffers. It performs both upstream and downstream interface functions on a Line Unit. These functions are simlar to the combination of 1/4 of both a UBIC and a DBIC. This device will be implemented in CPLD logic for release 1 @ 5V core /3.3V_IO. External GTL buffers will also be used to provide backplane interface as well as bus multiplexing. The QBIC can not be integrated (currently) with the QUIC-FPGA due to FPGA speed limitations. The CPLD is nearly twice as fast as the FPGA.. In a follow -on cost reduction effort this function will be integrated into hard ASIC with both buffers and the QUIC and will operate entirely at 3.3V.

DSC Access Products Proprietary Data

What is claimed is:

1. A switching fabric comprising:

at least one switch;

a plurality of line units;

a cell bus comprising a plurality of conductors that electrically couple a switch to a plurality of line cards in said switching fabric, said cell bus for transmitting a cell of a predetermined size; and said switching fabric comprising a minimum bandwidth requirement that specifies delivery of a predetermined numbers of said cells per unit of time to said line cards via said cell bus, said switching fabric including a plurality of control parameters that control flow of said cells from said switch to said line cards; and cell bus interface for transmitting a cell bus frame on said cell bus, said cell bus frame comprising said cell and said control parameters, such that a maximum size of a cell bus frame permits transmission of said cell and said control parameters on said conductors to meet said minimum bandwidth requirement, whereby encapsulating said control parameters for said switching fabric into said cell bus frame reduces the number of conductors in said switching fabric.

2. The switching fabric as set forth in claim 1, wherein said cell bus further comprises:

a cell clock line for conducting a cell clock that provides timing for said cell bus; and a cell sync line for conducting a cell sync signal that delineates between said cell bus frames.

3. The switching fabric as set forth in claim 1, wherein said cell bus comprises a point to point bus between said switch and said line cards.

4. The switching fabric as set forth in claim 1, wherein said cell bus comprises a bus shared among a plurality of cell bus interfaces.

5. The switching fabric as set forth in claim 1, wherein said control parameter further comprises a check sum to validate said cell bus frame.

6. The switching fabric as set forth in claim 1, wherein said cell bus interface comprises circuitry for transmitting and receiving data for bi-directional transmission of data on said bus.

7. The switching fabric as set forth in claim 1, wherein said cell comprises an asynchronous transfer mode (ATM) cell of 53 bytes.

8. The switching fabric as set forth in claim 1, wherein said control parameter comprises an idle bit that indicates an active cell bus frame.

9. A method for reducing a number of conductors required on a switching fabric, said method comprising the steps of:

generating a cell bus comprising a plurality of conductors that electrically couple a switch to a plurality of line cards in a switching fabric, said cell bus for transmitting a cell of a predetermined size and said switching fabric comprising a minimum bandwidth requirement that specifies delivery of a predetermined numbers of said cells per unit of time to said line cards via said cell bus, said switching fabric including a plurality of control parameters that control flow of said cells from said switch to said line cards; and generating a cell bus frame for transmission on said cell bus, said cell bus flame comprising said cell and said control parameters, such that a maximum size of a cell bus frame permits transmission of said cell and said control parameters on said conductors to meet said minimum bandwidth requirement, whereby encapsulating said control parameters for said switching fabric into said cell bus frame reduces the number of conductors in said switching fabric.

10. A line card for a telecommunications device comprising:

a plurality of conductors that electrically couple said line card to a switch in a switching fabric, said conductors for transmitting a cell of a predetermined size; and said switching fabric comprising a minimum bandwidth requirement that specifies delivery of a predetermined number of said cells per unit of time to said line card via said conductors, said switching fabric including a plurality of control parameters that control flow of said cells from said switch to said line card; and a cell bus interface, coupled to said conductors, for transmitting a cell bus frame on said conductors, said cell bus frame comprising said cell and said control parameters, such that a maximum size of a cell bus frame permits transmission of said cell and said control parameters on said conductors to meet said minimum bandwidth requirement, whereby encapsulating said control parameters for said switching fabric into said cell bus frame reduces the number of conductors in said line card.

11. The line card as set forth in claim 10, further comprising a cell bus interface for generating said cell bus frame for transmission upstream.

12. The line card as set forth in claim 10, wherein said conductors further comprise:

a cell clock line for receiving a cell clock that provides timing for said cell bus frame; and a cell sync line for receiving a cell sync signal that delineates between said cell bus frames.

13. The line card as set forth in claim 10, wherein said control parameter further comprises a check sum to validate said cell bus frame.

14. The line card as set forth in claim 10, wherein said cell comprises an asynchronous transfer mode (ATM) cell of 53 bytes.

15. The line card as set forth in claim 10, wherein said control parameter comprises an idle bit that indicates an active cell bus frame.

* * * * *